United States Patent
Kneissl et al.

(10) Patent No.: US 10,855,494 B2
(45) Date of Patent: Dec. 1, 2020

(54) TRANSMITTER AND RECEIVER AND CORRESPONDING METHODS

(71) Applicants: Fraunhofer-Gesellschaft zur Foerderung der angewandten Forschung e.V., Munich (DE); Friedrich-Alexander-Universitaet Erlangen-Nuernberg, Erlangen (DE)

(72) Inventors: Jakob Kneissl, Fuerth (DE); Gerd Kilian, Erlangen (DE); Josef Bernhard, Nabburg (DE); Joerg Robert, Uttenreuth (DE); Johannes Wechsler, Spalt (DE); Dominik Soller, Schwaig (DE); Wolfgang Koch, Schnaittach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/591,336

(22) Filed: Oct. 2, 2019

(65) Prior Publication Data
US 2020/0036557 A1 Jan. 30, 2020

Related U.S. Application Data

(63) Continuation of application No. PCT/EP2018/025097, filed on Apr. 6, 2018.

(30) Foreign Application Priority Data

Apr. 11, 2017 (DE) .................. 10 2017 206 248

(51) Int. Cl.
*H04L 25/02* (2006.01)
*H04L 27/26* (2006.01)
*H04J 3/06* (2006.01)

(52) U.S. Cl.
CPC ...... *H04L 25/0226* (2013.01); *H04L 27/2613* (2013.01); *H04J 3/0685* (2013.01); *H04L 27/261* (2013.01)

(58) Field of Classification Search
CPC .... H04J 3/0685; H04L 27/261; H04L 5/0051; H04L 7/046; H04L 7/10; H04L 25/0226
(Continued)

(56) References Cited

U.S. PATENT DOCUMENTS

| | | | |
|---|---|---|---|
| 5,103,459 A | 4/1992 | Gilhousen et al. |
| 6,157,820 A | 12/2000 | Sourour et al. |

(Continued)

FOREIGN PATENT DOCUMENTS

| | | |
|---|---|---|
| CN | 1057884 C | 10/2000 |
| DE | 102011082098 B4 | 3/2013 |

(Continued)

OTHER PUBLICATIONS

Kilian, G., et al; "Improved coverage for low-power telemetry systems using telegram splitting", Proceedings of 2013 European Conference on Smart Objects, Systems and Technologies (SmartSysTech), 2013, Jun. 2013, 6 pages.

(Continued)

*Primary Examiner* — Leila Malek
(74) *Attorney, Agent, or Firm* — Michael A. Glenn; Perkins Coie LLP

(57) ABSTRACT

A transmitter is configured to transmit signals each having a pilot sequence including a plurality of pilot sequence symbols, wherein the transmitter includes a signal generator, wherein the signal generator is configured to provide the pilot sequence starting from a base sequence which includes a plurality of base sequence symbols, wherein the signal generator provides the pilot sequence symbols starting from the base sequence symbol successively repeated R−1 times, (Continued)

and wherein R is a natural number greater than or equal to two, wherein the base sequence is configured such that a correlation of the pilot sequence with a transmission signal formed from the pilot sequence has a main maximum which is as narrow as possible and/or secondary maximums which are as small as possible.

13 Claims, 10 Drawing Sheets

(58) Field of Classification Search
USPC .......................................................... 375/295
See application file for complete search history.

(56) References Cited

U.S. PATENT DOCUMENTS

| | | |
|---|---|---|
| 2006/0040616 A1 | 2/2006 | Wheatley |
| 2008/0165891 A1 | 7/2008 | Budianu et al. |
| 2009/0168730 A1 | 7/2009 | Baum et al. |
| 2010/0202542 A1 | 8/2010 | Haustein et al. |
| 2012/0099628 A1 | 4/2012 | Kim et al. |
| 2014/0176341 A1 | 6/2014 | Bernhard et al. |
| 2014/0254648 A1* | 9/2014 | Van Nee ............... H04B 7/0413 375/224 |

FOREIGN PATENT DOCUMENTS

| | | |
|---|---|---|
| RU | 2005135636 A | 3/2006 |
| RU | 2411681 C1 | 2/2011 |
| RU | 2478260 C2 | 3/2013 |
| WO | 2015128385 A1 | 9/2015 |
| WO | 2017167366 A1 | 10/2017 |

OTHER PUBLICATIONS

Yu Zh. H, et al; "OFDM Timing and Frequency Offset Estimation Based on Repeated Training Sequence", Wireless Communications, Networking and Mobile Computing, 2007. WICOM 2007. International Conference on, IEEE, Piscataway, NJ, USA, Sep. 21, 2007 (Sep. 21, 2007), pp. 264-266, XP031261247., Sep. 2007, 264-266.

Mengali, Umberto, et al; "Synchronization Techniques for Digital Receivers", Plenum Press, 1997, ISBN 0-306-45725-3; University of Pisa, Italy;, 1997, 4 pages.

Choi, Ze Yong, et al., "Frame synchronization in the presence of frequency offset," Communications, IEEE Transactions on, vol. 50, No. 7, pp. 1062-1065, 2002., Jul. 2002, 1062-1065.

Garg, Deepshikha, et al., "Chip interleaved turbo codes for DS-CDMA in a Rayleigh fading channel with diversity reception", VTC 2002-FALL. 2002 IEEE 56th. Vehicular Technology Conference Proceedings. Vancouver, Canada, Sep. 24-28, 2002; [IEEE Vehicular Technolgy Conference], New York, NY : IEEE, US,Band 3, 24. Sep. 2002 (Sep. 24, 2002), Seite 1777-1781, XP010608735., Sep. 2002, 1777-1781.

Kilian, Gerd, et al., "Increasing Transmission Reliability for Telemetry Systems Using Telegram Splitting", IEEE Transactions on Communications, vol. 63, No. 3, pp. 949-961, Mar. 2015., Mar. 2015, 949-961.

Lambretti, Uwe, et al., "Comparison of Demodulation Techniques for MSK, RWTH Aachen", https://www.ice.rwth-aachen.de/fileadmin/publications/Lambrette95TIRR.pdf, last retrieved: Sep. 19, 2016, 1996, 12 pages.

Park, Byungjoon, et al., "A novel timing estimation method for OFDM systems", IEEE Communications Letters, IEEE Service Center, Piscataway, NJ, US, vol. 7, No. 5, May 1, 2003 (May 1, 2003), pp. 239-241, XP011423731., May 1, 2003, 239-241.

Sust, M. K., et al., "Rapid acquisition concept for voice activated CDMA communication", IEEE Global Telecommunications Conference, 1990 Bd. 3, 1990, 1990, 1820-1826.

Wang, S. S. (Peter), et al., "Analysis of Down-Link Location Methods for WCDMA and CDMA2000", Connecting the Mobile World: Proceedings / IEEE VTS 53RD Vehicular Technology Conference, Spring, 2001; [IEEE Vehicular Technolgy Conference], IEEE Service Center, USA, Band CONF. 53, May 6, 2001 (May 6, 2001), Seite 2580-2584, XP001076225., 2001, 2580-2584.

Kay, Steven M., "Fundamentals of Statistical Signal Processing—vol. 2: Detection Theory", Prentice Hall, 1998, ISBN: 0-13-345711-7, 1998, 1998.

Kellermann, Walter , et al., "Digital Signal Processing", lecture notes from WS 2016/17, Chair in Multimedia Communication and Signal Processing (LMS) at the Friedrich-Alexander-University Erlangen-Nuernberg, 2006, 2006.

Koch, Wolfgang , Script for the Seminar Empfängersynchronisation (Receiver Synchronization) at Fraunhofer IIS, Jun. 10-15, 2015, 2015, 2015.

* cited by examiner

000101

001011

001101

010001

TRANSMITTER AND RECEIVER AND CORRESPONDING METHODS

CROSS-REFERENCES TO RELATED APPLICATIONS

This application is a continuation of copending International Application No. PCT/EP2018/025097, filed Apr. 6, 2018, which is incorporated herein by reference in its entirety, and additionally claims priority from German Application No. DE 10 2017 206 248.7, filed Apr. 11, 2017, which is incorporated herein by reference in its entirety.

The invention relates to a transmitter as well as to a receiver and corresponding methods for transmitting and receiving signals.

BACKGROUND OF THE INVENTION

In many data transmission systems, pilot sequences (also referred to as training sequences or synchronization sequences) are inserted into the data streams to be transmitted for signal detection or parameter estimation. This can be both the transmission of an uninterrupted data stream in which pilot sequences are scattered at certain intervals, and a packet-oriented transmission in which each packet (also referred to as telegram) usually contains exactly one pilot sequence. The pilot sequence is also called preamble or midamble if it is located at the beginning or in the middle of the packet. However, a pilot sequence can also be distributed within the packet in the form of two or more subsequences.

In telemetry systems, sensor networks and applications under the keyword Internet of Things (IoT), asynchronous packet transmission usually takes place with long transmission pauses between the packets.

In asynchronous packet transmission, the transmitter and receiver are not synchronized, i.e. the receiver does not know the transmission timeslots of the individual data packets. In order not to miss a packet, during the entire receive standby time it may continuously check its receive signal for the presence of a packet and estimate the temporal position of the same with a certain accuracy.

Aggravating this situation, the actual carrier frequency of the transmission signal can deviate considerably from the nominal frequency and change over time. The center frequency of the receive filter can also deviate from the nominal frequency. From the receiver's point of view, the frequency difference between the carrier frequency of the transmission signal and the center frequency of the receive filter—hereinafter referred to as frequency offset—is decisive. For data detection, an estimation of the instantaneous frequency offset and, in the case of coherent detection methods, a phase estimation may also be used.

In total, two topics have to be successively processed by the receiver:
1. Detection: identification of a packet and at least rough estimation of its time position, if need be the spectral position is also considered.
2. Synchronization consisting of
    time synchronization: estimation of the exact time position of the packet,
    frequency synchronization: estimation and correction of the frequency offset, and
    phase synchronization: estimation of the phase after frequency correction has taken place.

By using an asynchronous system, a detection of the telegrams may be performed by means of a pilot sequence. The receiver may continuously search in its receive signal whether a telegram has been transmitted by a sensor node. The receiver's decision as to whether the receive signal was caused by noise or by a transmission signal is referred to as telegram detection or, briefly, only as detection. For this purpose, the data to be transmitted is typically preceded by a pilot sequence (often referred to as "markers" in English literature) with fixedly defined pilot symbols.

The object underlying the invention is to propose a transmitter and a receiver which use pilot sequences for data communication and which simplify the detection and/or processing of pilot sequences.

SUMMARY

An embodiment may have a transmitter, wherein the transmitter is configured to transmit signals each including one pilot sequence including several pilot sequence symbols, wherein the transmitter includes a signal generator, wherein the signal generator is configured to provide the pilot sequence based on a base sequence including several base sequence symbols, wherein the signal generator provides the pilot sequence with L pilot sequence symbols by repeating each base sequence symbol R−1 times in succession so that each base sequence symbol is present R times, wherein L is a natural number, and wherein R is a natural number greater than or equal to two and is a divisor of L, wherein the base sequence is configured such that a correlation of the pilot sequence with a transmission signal formed from the pilot sequence includes a main maximum which is as narrow as possible and/or secondary maximums which are as small as possible, wherein the pilot sequence includes eight or twelve pilot sequence symbols, wherein, in the case where the pilot sequence includes eight pilot sequence symbols, the base sequence includes one of the following forms: 0010 or 1101 or 0100 or 1011, and wherein the zeros and ones are each the binary base sequence bits; wherein, in the case where the pilot sequence includes twelve pilot sequence symbols, the base sequence includes one of the following forms or forms acquired therefrom by reversing the bit order: 000101, 001011, 001101, 010001, 111010, 110100, 110010 or 101110, and wherein the zeros and ones are each the binary base sequence bits.

Another embodiment may have a method for transmitting signals, wherein the signals are each transmitted with a pilot sequence including a plurality of pilot sequence symbols, wherein the pilot sequence is provided starting from a base sequence including a plurality of base sequence symbols, wherein the pilot sequence symbols are provided by repeating each base sequence symbol R−1 times in succession so that each base sequence symbol is present R times, wherein L is a natural number, and wherein R is a natural number greater than or equal to two and is a divisor of L; and wherein the base sequence is configured such that a correlation of the pilot sequence with a transmission signal formed from the pilot sequence includes a main maximum which is as narrow as possible and/or secondary maximums which are as small as possible, wherein the pilot sequence includes eight or twelve pilot sequence symbols, wherein, in the case where the pilot sequence includes eight pilot sequence symbols, the base sequence includes one of the following forms: 0010 or 1101 or 0100 or 1011, and wherein the zeros and ones are each the binary base sequences bits; wherein, in the case where the pilot sequence includes twelve pilot sequence symbols, the base sequences includes one of the following forms or forms acquired therefrom by reversing the bit order: 000101, 001011, 001101, 010001, 111010, 110100, 110010 or 101110, and wherein the zeros and ones are each the binary base sequence bits.

Another embodiment may have a transmitter, wherein the transmitter is configured to transmit signals each including one pilot sequence including several pilot sequence symbols, wherein the pilot sequence includes one of the following forms or forms acquired therefrom by reversing the bit order: 00001101 or 11110010 or 10110000 or 01001111 or 01011000 or 10100111 or 00011010 or 11100101 or 01000011 or 10111100 or 11000010 or 00111101 or 00010110 or 11101001 or 01101000 or 10010111 or 10000110 or 01111001 or 01100001 or 10011110 or 00101100 or 11010011 or 00110100 or 11001011, and wherein the zeros and ones are each the binary base sequence bits.

Another embodiment may have a method for transmitting signals, wherein the signals are each transmitted with a pilot sequence including a plurality of pilot sequence symbols, wherein the pilot sequence includes one of the following forms or forms acquired therefrom by reversing the bit order: 00001101 or 11110010 or 10110000 or 01001111 or 01011000 or 10100111 or 00011010 or 11100101 or 01000011 or 10111100 or 11000010 or 00111101 or 00010110 or 11101001 or 01101000 or 10010111 or 10000110 or 01111001 or 01100001 or 10011110 or 00101100 or 11010011 or 00110100 or 11001011, and wherein the zeros and ones are each the binary base sequences bits.

Another embodiment may have a non-transitory digital storage medium having a computer program stored thereon to perform the method for transmitting signals, wherein the signals are each transmitted with a pilot sequence including a plurality of pilot sequence symbols, wherein the pilot sequence includes one of the following forms or forms acquired therefrom by reversing the bit order: 00001101 or 11110010 or 10110000 or 01001111 or 01011000 or 10100111 or 00011010 or 11100101 or 01000011 or 10111100 or 11000010 or 00111101 or 00010110 or 11101001 or 01101000 or 10010111 or 10000110 or 01111001 or 01100001 or 10011110 or 00101100 or 11010011 or 00110100 or 11001011, and wherein the zeros and ones are each the binary base sequences bits, when said computer program is run by a computer.

The transmitter is configured so as to transmit signals each with a pilot sequence comprising several pilot sequence symbols. The transmitter includes a signal generator. The signal generator provides the pilot sequence starting from a base sequence comprising at least one base sequence symbol. In particular, the signal generator provides the pilot sequence symbols starting from the base sequence symbol successively repeated (R−1) times, wherein R is a natural number greater than or equal to two.

In one configuration, the signal generator provides the pilot sequence starting from a base sequence with several base sequence symbols.

Thus, the transmitter transmits signals which each comprise a pilot sequence. The pilot sequences have several pilot sequence icons. Thereby, a signal generator provides the respective pilot sequence starting from a base sequence that has at least one base sequence symbol and, in one configuration, several base sequence symbols. This includes, for example, the fallback on stored pilot sequences or generating the pilot sequence starting from the base sequence. The provision also includes, for example, generating the symbols of the signal to be transmitted depending on a mapping, e.g. MSK.

The base sequence symbol is successively repeated in the pilot sequence (R−1) times so that the base sequence symbol is present in R times. Accordingly, the base sequence symbols in the pilot sequence are successively repeated (R−1) times so that each base sequence symbol is present R times. This means that it is sufficient if only every $R^{th}$ symbol on the receiver side is recorded and evaluated for detection. This results in the total desired length of the pilot sequence as the number of pilot sequence symbols and at the same time the effort for an initial evaluation of the received signal is reduced. This means that optimized pilot sequences are available for computationally optimized detection by means of a sub-sampling on the receiver side.

The sequence of the base sequence symbols present R-fold In each case (in some configurations possibly still further symbols) are mapped in one configuration with a modulation alphabet. In one configuration, a digital modulation method is used. In one variant, for example, this is binary phase shift keying (binary PSK, BPSK). For example, binary 1 is mapped to +1 and binary 0 to −1. If, for example, a base sequence with the symbols 0110 is given, a simple repetition results in the sequence of symbols 00111100. After a BPSK, this results in the symbols: [−1, −1, +1, +1, +1, +1, −1, −1].

In one configuration, the signal generator generates at least one symbol block in the pilot sequence, which includes the at least one base sequence symbol and its (R−1) repetitions.

In one configuration, the signal generator provides the pilot sequence starting from a base sequence comprising several base sequence symbols and provides symbol blocks in the pilot sequence, each comprising a base sequence symbol and its repetitions. Furthermore, the signal generator provides the pilot sequence in such a way that the symbol blocks of the base sequence symbols immediately follow each other in an order of base sequence symbols within the base sequence. In this configuration, the R-fold base sequence symbols in the pilot sequence are referred to as symbol blocks which occur in that order in the pilot sequence that the base sequence symbols have in the base sequence. Furthermore, the symbol blocks follow each other directly.

In one configuration, it is provided that the pilot sequence has L pilot sequence symbols, wherein L is a natural number. A number of the base sequence symbols is then equal to a quotient of L divided by R. If the pilot sequence has a length of eight symbols and each base sequence symbol is repeated once, i.e. if R=2, four base sequence symbols may be used.

In one configuration, each base sequence symbol is repeated once so that R=2.

One configuration is that the base sequence is configured such that a correlation of the pilot sequence with a transmission signal formed from the pilot sequence has a main maximum which is as narrow as possible and/or a secondary maximum which is as small as possible. This refers to the selection of the base sequence. More precisely, the configuration describes the correlation of the actual pilot sequence with the modulated (time-continuous) signal formed from it, which is transmitted by the transmitter.

In one configuration, it is provided that in the case that the pilot sequence has eight pilot sequence symbols, the base sequence has one of the following forms: 0010 or 1101 or 0100 or 1011. Thereby, the zeros and ones are respectively the binary base sequence bits. The sequences given here and in the following in one configuration are in particular related to the Minimum Shift Keying (MSK) as a type of mapping of the binary symbols to the signal sections to be generated from it in real. Alternatively or in addition, the sequences given here and in the following apply to other linear or quasi-linear modulation methods such as MSK or GMSK.

The bits described are converted to the actual symbols by a respective modulation and/or by a mapping.

One configuration is that in case the pilot sequence has twelve pilot sequence symbols, the base sequence has one of the following forms or forms obtained therefrom by reversing the bit order: 000101, 001011, 001101, 010001, 111010, 110100, 110010 or 101110. Thereby, the zeros and ones are each the binary base sequence bits. When selecting the base sequence, it is generally known that a bit inversion and a reversal of the bit order do not change the correlation properties of a sequence.

In one configuration it is provided that the signal generator in the pilot sequence provides at least one symbol block comprising a base sequence symbol and its (R−1) repetitions, wherein the base sequence symbols are provided with phase factors. This configuration refers both to the case that the base sequence comprises only one base sequence symbol and to the case that the base sequence comprises several base sequence symbols. In the aforementioned configuration, thus, a base sequence symbol successively appears R-fold in the pilot sequence, however, provided with phase factors.

In one configuration it is provided that the signal generator provides the pilot sequence starting from a base sequence comprising several base sequence symbols. In the pilot sequence, the signal generator thereby provides symbol blocks which each comprise a base sequence symbol and its (R−1) repetitions and are therefore each R symbol long. The signal generator provides the base sequence symbols with phase factors such that the phase factors of the i$^{th}$ occurrence of a base sequence symbol in a symbol block are the same for all symbol blocks. i is a natural number between 1 and R and indicates the position of a base sequence symbol in the corresponding symbol block. The i$^{th}$ occurrence with i=1 is the zeroth repetition. Further explanations can be found in the following description. One configuration in particular provides that the repeated symbols are provided with different phase factors.

In one configuration, the phase factors are components of a modulation alphabet. A modulation alphabet thereby is generally used to convert digital symbols for the analog processing and/or presently the signal transmission.

Thus, the first base sequence symbol has the same phase factor in all symbol blocks and the respective second—i.e. located at the second position—base sequence symbol respectively has the same phase factor in all symbol blocks, which differs in one configuration from the phase factor of the respective first base sequence symbol. Thus, when all base sequence symbols are considered, the step width of the same phase factors is given by the repetition of the base sequence symbols.

One configuration is that the phase factors result from a product of a phase identified with $\varphi_r$ and the imaginary number j as exponent of the natural exponential function, wherein the phase $T_r$ lies between 0 and $2\pi$ or 0° and 360°.

One configuration is that in the case where the pilot sequence has eight pilot sequence symbols, the pilot sequence has one of the following forms or forms obtained therefrom by reversing the bit order: 01011001, 10100110, 10011010, 01100101, 00001100, 11110011, 00110000, 11001111. Thereby, the zeros and ones are each the binary pilot sequence bits. In the pilot sequences, the symbols are transmitted in the order specified.

In one configuration, it is provided that in the case that the pilot sequence has twelve pilot sequence symbols, the pilot sequence has one of the following forms or forms obtained therefrom by reversing the bit order:
000000110011 or 111111001100 or 1100110000 or 001100111111 or 010101100110 or 101010011001 or 011001101010 or 100110010101 or 000011001111 or 111100110000 or 010110011010 or 101001100101 or 000011110011 or 111100001100 or 110011110000 or 001100001111 or 010110100110 or 101001011001 or 011001011010 or 100110100101 or 001100000011 or 110011111100 or 110000001100 or 001111110011 or 011001010110 or 100110101001 or 011010100110 or 100101011001.

Thereby, the zeros and ones are the binary pilot sequence bits. In one configuration, the above pilot sequences are related to the MSK mapping.

The signal generator may provide the pilot sequence such that the pilot sequence has at least one supplementary symbol. The signal generator provides at least one symbol block in the pilot sequence, which comprises a base sequence symbol and its (R−1) repetitions. The signal generator provides the pilot sequence such that at least one supplementary symbol precedes or follows the symbol block.

In one configuration, it is provided that the signal generator provides the pilot sequence such that the pilot sequence has at least one supplementary symbol. Thereby, the signal generator provides symbol blocks in the pilot sequence, each comprising a base sequence symbol and its repetitions. Furthermore, the signal generator provides the pilot sequence such that at least one supplementary symbol precedes or follows the symbol blocks. In one configuration, the symbol blocks follow each other directly so that there are no supplementary symbols between the symbol blocks and the supplementary symbols only follow or precede.

In one configuration it is provided that the signal generator provides the pilot sequence such that the pilot sequence has at least two supplementary symbols. Thereby, the signal generator provides the pilot sequence such that at least one supplementary symbol of the at least two supplementary symbols precedes the symbol blocks and at least one other supplementary symbol of the at least two supplementary symbols follows the symbol blocks. The pilot sequences thus consist of a core formed by the R-fold base sequence symbols and a kind of embrace by the supplementary symbols.

On configuration is that the at least one supplementary symbol or the at least two supplementary symbols is or are configured such that a correlation of the pilot sequence with a transmission signal formed from the pilot sequence has a main maximum which is as narrow as possible and/or a secondary maximum which is as small as possible. The choice of the supplementary symbol or symbols is thus based on the fact that the resulting pilot sequence can be identified and/or synchronized as well as possible.

In one configuration it is provided that in the case that the pilot sequence has eight pilot sequence symbols, the base sequence has the form 001 and two supplementary bits are present which together have one of the following forms: 01 or 10 or 00 or 11. Thereby, the zeros and ones are respectively binary base sequence bits and the binary supplementary bits. Similar to the other bits already mentioned, the supplementary bits are converted into the supplementary symbols by a corresponding mapping. The same applies to the base sequence bits.

A complementary or alternative arrangement to the above configuration is that the pilot sequence has one of the following forms or forms obtained therefrom by reversing the bit order:
00001101 or 11110010 or 10110000 or 01001111 or 01011000 or 10100111 or 00011010 or 11100101 or 01000011 or 1010011100 or 11000010 or 00111101 or 00010110 or 11101001 or 01101000 or 10010111 or 10000110 or 01111001 or 01100001 or 10011110 or 10011110 or 00101100 or 11010011 or 00110100 or 11001011.

Thereby, the zeros and ones are the binary pilot sequence bits. In one configuration, the above pilot sequences are related to the MSK mapping.

In one configuration it is provided that in the case that the pilot sequence has twelve pilot sequence symbols, the base sequence has the form 00010, and two supplementary bits are present which together have one of the following forms: 01 or 10 or 00 or 11. Thereby, the zeros and ones are each binary base sequence bits and the binary supplementary bits.

A complementary or alternative arrangement to the above configuration is that the pilot sequence has one of the following forms or forms obtained therefrom by reversing the bit order:
100000011001 or 011111100110 or 100110000001 or 011001111110 or 001010110011 or 110101001100 or 110011010100 or 001100101011 or 000000110010 or 111111001101 or 010011000000 or 1011001111 or 010101100111 or 101010011000 or 111001101010 or 000110010101 or 010000001100 or 101111110011 or 001100000010 or 1100111101 or 000101011001 or 111010100110 or 100110101000 or 011001010111.

Thereby, the zeros and ones are the binary pilot sequence bits. In one configuration, the above pilot sequences are related to the MSK mapping.

Furthermore, the invention achieves the object by means of a method for transmitting signals.

Thereby, the method includes at least the following steps:
the signals are each transmitted with a pilot sequence comprising a plurality of pilot sequence symbols, and
the pilot sequences are provided starting from a base sequence having at least one base sequence symbol such that the base sequence symbol repeatedly forms pilot sequence symbols at least successively.

The above configurations of the transmitter can be realized by steps of corresponding configurations of the method so that here a repetition of the embodiments is dispensed with.

The invention also achieves the object by a receiver.

The receiver is configured to receive at least one signal and to evaluate it with regard to a pilot sequence. In one configuration, the receiver falls back to stored or generally known reference sequences for the evaluation.

In one configuration, the reference sequence known—to the receiver—corresponds to the pilot sequence used by the transmitter for transmission, and this reference sequence is used by the receiver to evaluate the pilot sequence which includes the received signal.

The following configurations each relate to particular variants of the evaluation or signal processing for the evaluation. Thus, in particular aids or auxiliary components of the receiver are described which are used for evaluation with regard to the pilot sequence.

In one configuration, the receiver includes a signal evaluation device.

The signal evaluation device is configured such that the received signal is subjected to an initial evaluation. Thereby, the signal evaluation device at least partially samples the received signal during the first evaluation at a first sampling rate. Alternatively or in addition, the signal evaluator uses only each $i^{th}$ sample for processing samples of the received signal. Thereby, i is a natural number greater than or equal to two. In addition, the signal evaluation device generates an evaluation result regarding the pilot sequence during the first evaluation.

Depending on the evaluation result, the signal evaluation device subjects the received signal to a second evaluation. For this, the signal evaluation device at least partially samples the received signal during the second evaluation at a second sampling rate. Alternatively or in addition, the signal evaluation device uses only every $k^{th}$ sample in the second evaluation for further processing of samples of the received signal. Thereby, the second sampling rate is larger than the first sampling rate and/or k is a natural number smaller than i.

The signal evaluation device thus performs a sub-sampling in a first evaluation by either setting the sampling rate during sampling accordingly or by processing fewer samples. If, in particular, signals from the transmitter described above are used with the pilot sequences based on the base sequences, a sub-sampling is sufficient due to the repetition of the symbols.

Therefore, an evaluation result can already be generated during the first evaluation, which provides information on whether a pilot sequence has been detected. If this is the case, in one configuration, the second evaluation takes place in which a higher sampling rate is used. In one configuration, this allows to verify a positive evaluation result of the first evaluation. For example, in the second evaluation it can be determined whether each symbol of the base sequence is really present R-fold.

In one configuration, it is provided that the signal evaluation device, in the first evaluation, identifies from the received signal a reduced pilot sequence consisting of a number of symbols, wherein the number of symbols of the reduced pilot sequence is equal to a number of symbols of a base sequence. Thereby, for generating the evaluation result, the signal evaluation device compares the identified reduced pilot sequence with stored base sequences (alternative designation is reference base sequences). If the first sampling rate corresponds to the repetition rate of the base sequence symbols, the result is a reduced pilot sequence that is ideally the same as the base sequence used to provide the pilot sequence. For this, the possible base sequences are available to the signal evaluation device by being stored in a configuration in a corresponding data memory.

One configuration is that the signal evaluation device determines correlations during the processing of samples or an approximation of correlations with stored base sequences. The stored base sequences are therefore also those which are generally used for generating the pilot sequences and can also be referred to as reference base sequences, for example.

In a further configuration of the receiver, the receiver includes a processing device. This processing device may be present as an alternative or as a supplement to the signal evaluation device.

The processing device is configured to divide the pilot sequence of the received signal into at least two subareas which partially overlap. The processing device correlates the at least two subareas of the pilot sequence with subareas of reference sequences and generates a partial result in each case. Finally, the processing device generates from the partial results an overall result with respect to the pilot sequence of the received signal.

In one configuration, the reference sequences are stored in a data memory.

In one configuration it is provided that the processing device adds the partial results incoherently to obtain the overall result.

According to one configuration, the processing device subjects the symbols of at least two subareas to a weighting before correlation, depending on how many subareas the symbols belong to. If the symbols thus belong to an overlapping area, they are weighted differently than if they belong to a non-overlapping area.

In a further configuration of the receiver, the receiver includes a transformation device. This transformation device may be present as an alternative or supplement to the signal evaluation device and/or the processing device.

The transformation device is configured to determine a Fourier transform separately for at least two subpackets of a pilot sequence or for at least two subpilot sequences. The transformation device adds the determined Fourier transform incoherently and generates an addition result. Moreover, the transformation device generates an evaluation result based on the addition result. In one configuration, the evaluation result is based on the application of reference sequences. In one configuration, the evaluation result applies with regard to the pilot sequence and alternatively with regard to the at least two subpilot sequences that belong to a common pilot sequence.

Depending on the configuration, a pilot sequence is thus divided into subpackets or received in the form of subpilot sequences. For example, a complete and coherent pilot sequence is received and divided into subsequences during the receiver evaluation.

In one configuration, the two subpackets belong to two received signals. The receiver thus receives at least two signals, to each of which at least one subpacket belongs.

In an alternative configuration, the two subpackets belong to one received signal.

According to one configuration, before determining the Fourier transform, the transformation device fills the subpacket or subsequence to be transformed with zeros at the beginning or end of the subpacket or subsequence.

One configuration provides that the transformation device, after determining the Fourier transform, performs an interpolation between a maximum and neighboring positions of the maximum of the subpacket or subsequence to be transformed.

In an alternative configuration, it is provided that the transformation device, after generating the addition result, performs an interpolation between a maximum and neighboring locations of the maximum of the subpacket to be transformed or of the subsequence to be transformed.

According to one configuration, the transformation device performs the interpolation with a second degree polynomial.

One configuration provides that the transformation device performs the interpolation with a polynomial of the following form: $y(x) = y_0 - c(x - x_0)^2$, wherein the free parameters $y_0$, $c$ and $x_0$ are determined on the basis of the maximum of the neighboring positions. The parameters are selected so that they each run through the maximum and the neighboring positions.

The transformation device determines a maximum value of the interpolation curve with the following function:

$$x_0 = \frac{1}{2} \frac{y(1) - y(-1)}{2y(0) - y(1) - y(-1)},$$

where $x_0$ is an abscissa value of a maximum of the polynomial, $y(0)$ is the maximum, and $y(-1)$ and $y(1)$ are the neighboring positions.

A second degree polynomial of the form $y(x) = y_0 - c(x - x_0)^2$ is used as an interpolation function in one configuration.

The abscissa value $x_0$ of the polynomial maximum, for example, represents the improved time estimate (normalized to the sampling interval T/N).

From the abscissa value $x_0$ of the polynomial maximum, the improved frequency estimated value can be determined via $$\hat{v}T = \frac{i_0 + x_0}{N_{FFT}} - \begin{cases} 0 & \text{for } i_0 < N_{FFT}/2 \\ 1 & \text{for } i_0 \geq N_{FFT}/2 \end{cases}$$

According to one configuration, the incoherent addition consists in an addition of the amounts or the amount squares or an approximation of the amounts of the determined Fourier transforms. An approximation of an amount is, for example, the sum of the amount of the real part and the amount of the imaginary part.

One configuration provides that the transformation device is configured so as to perform a fast Fourier transformation or a discrete Fourier transformation for an evaluation of the pilot sequence with regard to a frequency and/or a phase.

Furthermore, the invention achieves the object by a method for receiving at least one signal, wherein the received signal is evaluated with regard to a pilot sequence.

The above configurations of the receiver can be realized by steps of corresponding configurations of the method so that here a repetition of the embodiments is dispensed with.

In one configuration, the method comprises the following steps:

The received signal is subjected to an initial evaluation,
  in which the received signal is at least partially sampled at a first sampling rate, and/or
  in which only every sample value is used for further processing of samples $i^{th}$ of the received signal, and
  in which an evaluation result relating to the pilot sequence is generated,
  wherein i is a natural number greater than or equal to two.

Depending on the evaluation result, the received signal is subjected to a second evaluation,
  in which the received signal is at least partially sampled at a second sampling rate,
  and/or
  in which only every $k^{th}$ sample is used for further processing of samples of the received signal, and
  wherein the second sampling rate is greater than the first sampling rate and/or k is a natural number less than i.

The following steps are provided in an alternative or complementary configuration:

The pilot sequence of the signal is divided into at least two parts that partially overlap.

The at least two subareas are correlated with subareas of reference sequences and a partial result is generated in each case.

An overall result is generated from the partial results with regard to the pilot sequence.

In an equally alternative or complementary configuration, the method at least comprises the following steps:

For at least two subpackets of the pilot sequence or for at least two subpilot sequences, a Fourier transform is determined separately in each case.

The Fourier transforms determined are added incoherently and an addition result is generated.

An evaluation result for the pilot sequence is generated on the basis of the addition result and on the basis of the reference sequences.

Furthermore, the invention relates to a signal transmission system which has at least one transmitter in one of the configurations discussed above and at least one receiver in one of the configurations discussed above.

Finally, the invention relates to a computer program with a program code to carry out the above method according to one of the configurations.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
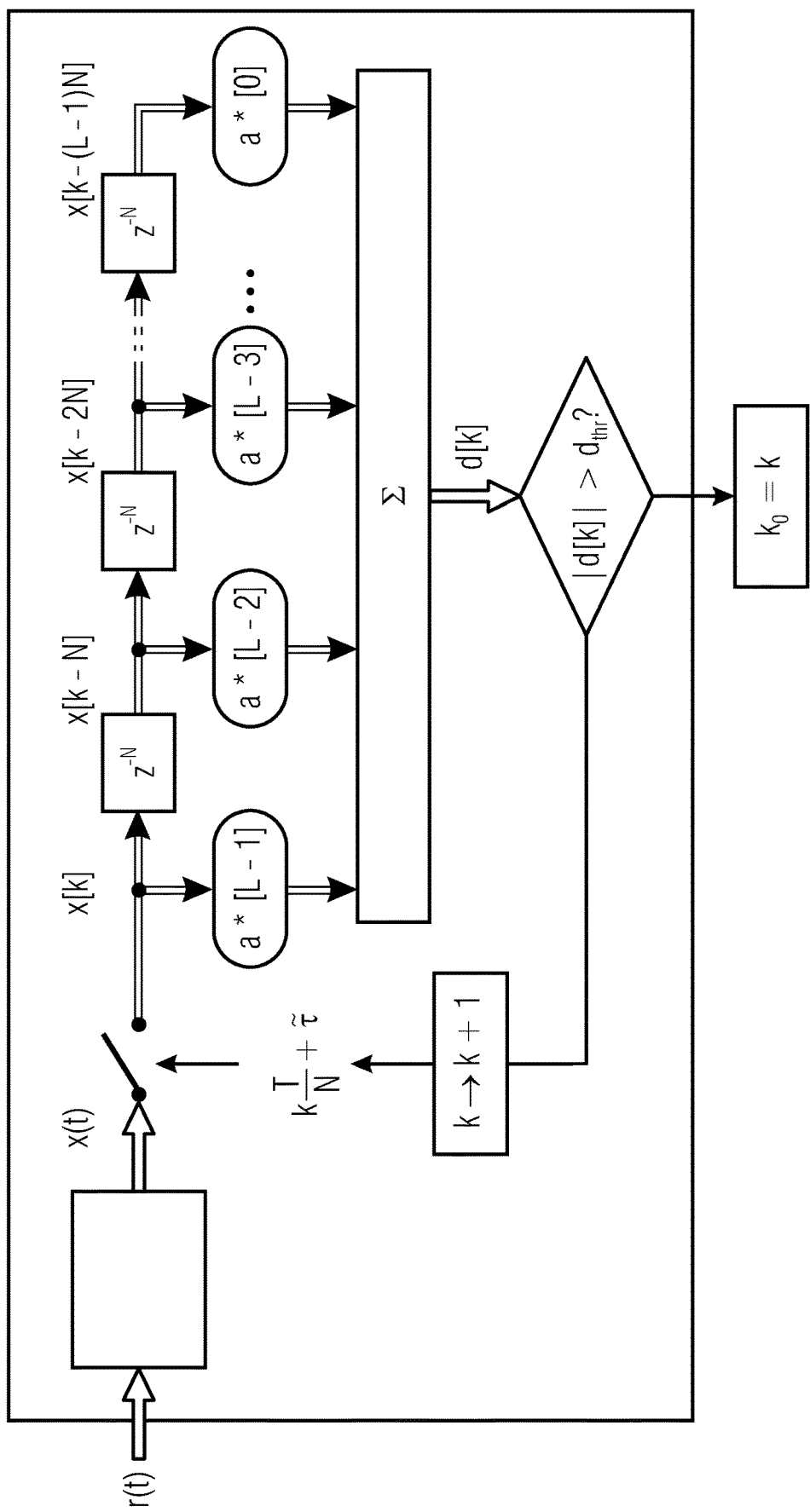
FIG. 1 shows a schematic representation of signal processing in accordance with the correlation method for detecting a pilot sequence.

In the following, the problems of an asynchronous system for data communication will be discussed once again. Thereby, the transmitter transmits signals which are provided with pilot sequences. The receiver receives signals and evaluates them with regard to a pilot sequence, i.e. the receiver examines the received signals for whether they have pilot sequences. For this purpose, the receiver partially falls back to known reference sequences.

A sampled receive signal is normally present in the receiver with a certain oversampling. In the receiver, for each time step k of the oversampled signal, the probability is evaluated that a synchronization sequence was present in the immediately preceding time window of the received signal. For this purpose, a function $f_{NP}(k)$ is applied to the samples of the received signal for each time step, the output value of which is compared with a threshold. If the function value exceeds the threshold, it is assumed that a pilot sequence has been transmitted at this point. The theoretical foundations of this method are dealt with in the so-called "detection theory" (Neyman-Pearson detector, [8]).

Up to now, correlation methods have been used for the practical implementation of the detection, in which the received signal is permanently correlated with the pilot sequence. For detection, the amount of the correlation result is evaluated. Subsequently, the threshold detection just described or a maximum likelihood (ML) detection or a combination of both takes place.

In the selection of the pilot sequences to be used, the autocorrelation function (ACF) has so far typically been consulted for the decision. Sequences are selected in which the secondary correlation peaks of the ACF are minimal and the ACF falls as steeply as possible on both sides of the main peak. This allows to determine the exact synchronization time very precisely. Furthermore, due to the low secondary correlation peaks, the number of false detections at the positions of these secondary peaks are reduced.

In DE 10 2011 082 098 A1, a method for battery-powered transmitters is described in which a data packet is divided into several subpackets, each of which transmits only a fraction of the total information (so-called "telegram splitting"). Such a subpacket is referred to as a "hop". Several information symbols are transmitted in a hop. The hops are transmitted on one frequency or distributed over several frequencies (so-called "frequency hopping"). Between the hops, there are pauses in which no transmission takes place.

In one configuration, such hops possibly are used by the transmitters or receivers described in the following.

The receiver uses the pilot sequence present in each telegram to carry out the topics mentioned in the general introduction: Detection and synchronization.

The pilot sequence consists of a number of L modulation symbols (also referred to as pilot symbols or here in the text pilot sequence symbols) and is usually transmitted compactly either at the beginning (preamble) or in the middle (midamble) of the telegram. Alternatively, the pilot sequence can also be arbitrarily scattered between the data symbols. It is common practice to take the pilot symbols from the same modulation alphabet as the data symbols (e.g. multiple phase-shift keying, M-PSK, or M-ary Quadrature Amplitude Modulation, M-QAM). The pilot symbols are known to the recipient in advance or are stored appropriately.

When telegram splitting is used, i.e. during splitting a telegram into several subpackets (also called fragments), each fragment contains its own pilot sequence. The individual fragments thereby usually contain the same pilot sequence.

In modern receivers of radio-based systems, it is common practice to mix the receive signal down into the baseband after bandpass filtering and to sample and quantize it equidistantly in time using an analog-to-digital converter (ADC).

Each sampled value is complex-valued and consists of a real and an imaginary part. Sampling thereby is carried out at least in symbol clock or, as a rule, at an integer multiple thereof (oversampling). One goal of the detection is therefore to search for the signal section with the pilot sequence in this sequence of samples. Various methods are known for this, which are briefly described in the following.

Low Frequency Offset Correlation Method

The sequence of samples of the received signal is correlated with the sequence of symbols of known reference sequences.

To determine a correlation value at time k, the sample value at time k and the preceding L−1 samples are taken from the received signal at symbol spacing. With an N-fold oversampling, only every $N^{th}$ sample is taken.

These L values are multiplied by the conjugated complex symbols of the pilot sequence. The products are then added together. Based on the amount of the correlation value thus obtained, it is decided whether the L samples contain the complete pilot sequence or not. The amount of the correlation value is therefore also called the decision variable.

An example of a complete signal processing at a sampling time k is shown in FIG. 1.

Thereby, the received signals r(t) are first subjected to a receive filter (e.g. the optimum filter, also known as the matched filter) in order to obtain the time-dependent function x(t). The marked estimated end of the pilot sequence is identified by $k_0$. Furthermore, T is the symbol spacing or 1/T is the symbol rate. N is the oversampling factor. τ is the deviation from the optimum sampling time (i.e. the time error) and $$k\frac{T}{N} + \tilde{\tau}$$

s is the time of the $k^{th}$ sampled value. In addition, a[0], a[1], a[L−1] are pilot symbols (or pilot sequence symbols), wherein the symbols a[0] are transmitted first and a[L−1] last. The superscript character * indicates that the conjugated complex value is to be taken. Finally, z-N denotes the delay element that delays N samples.

The following notation is generally used:

Time variables in round brackets are time-continuous. For example, r(t) denotes the time-continuous receive signal.

Time variables in square brackets are time-discrete and usually represent a consecutive numbering of samples. For example, x[k] denotes the $k^{th}$ value of the (time-continuous) signal x(t) after the receive filter.

For the decision whether a pilot sequence is present, two methods are essentially known, which are frequently used one after the other:

1. First, a threshold detection is usually carried out. The decision variable |d[k]| is compared with a threshold $d_{thr}$. If the decision variable is above the threshold, a pilot sequence is considered to be detected and the time index k marks the last sample of the sequence. Thus, a rough estimate of the temporal position of a pilot sequence is already available. This is the case in FIG. 1 when $k_0$=k is set. In the negative case, the counter k is increased: k becomes k+1.
2. From a detected pilot sequence, a maximum value detection can optionally be performed within a specified time window after the time from the first detection. For this purpose, the sample value with the maximum amount of the decision variable is used as the detection time. The time window is usually smaller than the telegram duration. This step increases the accuracy of time estimation, which is particularly advantageous for pilot sequences with unfavorable correlation properties.

Selection of the Pilot Sequence:

For a symbol alphabet with M symbols there are $M^L$ possible pilot sequences. With a binary symbol alphabet (M=2) and a pilot sequence length of L=8, there are a total of $2^8$=256 possible sequences.

For detection with the correlation method, the properties of the aperiodic autocorrelation function (AKF) of the pilot sequence are of central importance. Mathematically, this is defined by:

$$ACF[i] = \sum_{l=0}^{L-1} a^*[l]a[l+i] \text{ with } a[l] = 0 \text{ for } l < 1 \text{ or } l \geq L.$$

The maximum value is i=0 and is L for all sequences. If only the detection of the pilot sequence is considered, then all sequences are equally suitable.

However, in order to estimate the time as accurately as possible, it is desirable that the magnitudes of all ACF values for i≠0 are as small as possible in relation to the maximum value. These values are also called correlation secondary peaks.

An CKF is described as ideal if its correlation secondary peaks are zero. Unfortunately, there are no sequences with ideal an ACF.

Figure 2:
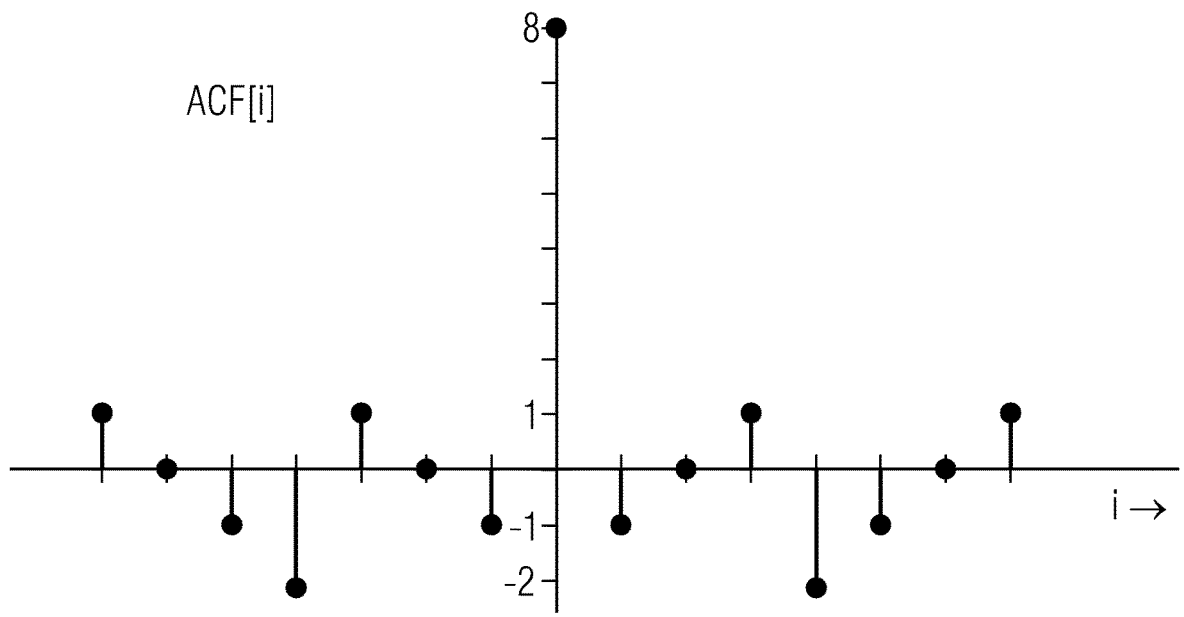
FIG. 2 shows an aperiodic autocorrelation function of a binary sequence 10010111.

Currently, it is common practice to use such pilot sequences comprising the smallest possible secondary peaks. An example for a binary sequence of length eight is 10010111. If the bits 0 and 1 are mapped to the symbols +1 and −1, the ACF of FIG. 2 results. Thereby, the ACF[i] is plotted on the y-axis over i on the x-axis. The secondary peaks have a maximum amplitude of 2.

Furthermore, it is common to use the time-continuous cross correlation function (CCF) between the modulated and filtered signal and the ACF of the pilot sequence to select pilot sequences instead of the time-discrete ACF. However, their form is essentially determined by the ACF of the pilot sequence, but also depends on the modulation impulse and the impulse response of the receive filter.

For linearly modulated signals and those which can be represented by linearly modulated signals (e.g. Minimum Shift Keying, MSK, or Gaussian Minimum Shift Keying, GMSK), it can be shown that this cross correlation function is given in normalized representation by:

$$CCF(t) = \frac{1}{L}\sum_{l=L-1}^{L-1} ACF[l]h(t+lT)$$

Here h(t) results from the convolution of the modulation pulse g(t) with the pulse response $g_r(t)$ of the receive filter.

For an accurate time estimation, sequences with a CCF that is as close as possible to the ideal CCF before and after the main maximum are advantageous. The ideal CCF results from the above formula with the theoretically ideal ACF of a pilot sequence. Then, it has the form of the pulse h(t). The above sequence 10010111 fulfils this property (see FIG. 3).

Figure 3:
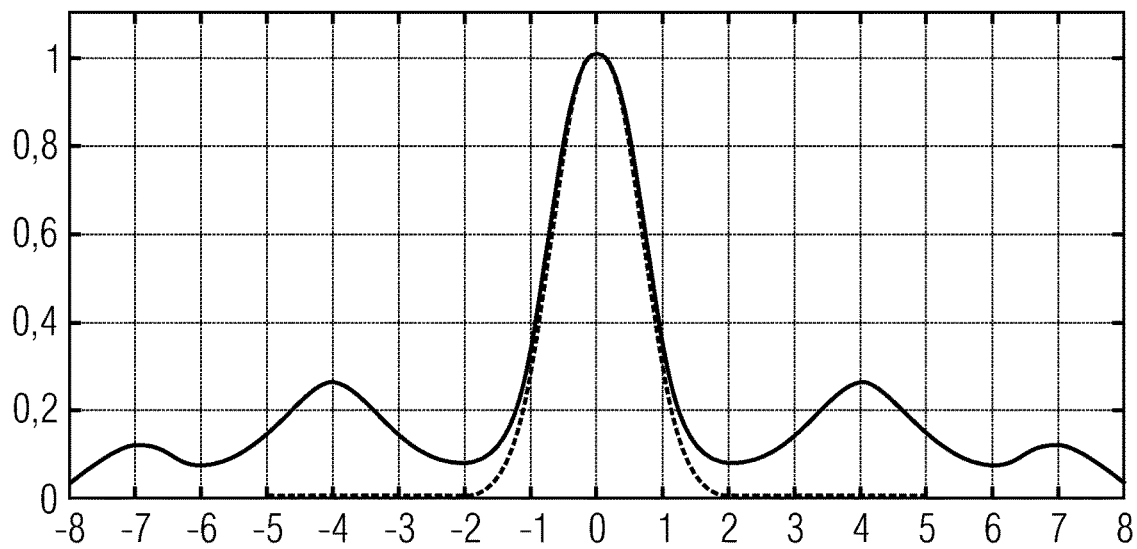
FIG. 3 shows the time continuous cross correlation function of the sequence 10010111 with MSK modulation and the matched filter of the MSK modulation.

In FIG. 3 also the ideal CCF for MSK in conjunction with a matched filter is plotted as a dotted line. The normalized CCF is plotted on the y-axis. The time offset k is plotted on the x-axis. Thus, the continuous CCF of sequence 10010111 with MSK modulation and a matched filter is shown. The dashed curve is the function h(t).

Detection Method at Unknown Frequency Offset:

A disadvantage of the correlation method described above is that the detection is only reliable for very small frequency differences (thus small frequency differences between the carrier frequency of the transmission signal and the center frequency of the receive filter). Further methods are therefore described below.

FFT Method:

In [9] a method is described which is also suitable for large frequency offsets. It can be seen as a generalization of the method described above. The essential features are summarized below.

The values x[k−l]a*[L−l+1] from FIG. 1 are multiplied by the samples of a complex exponential oscillation before summation. This is carried out several times for different frequencies of vibration which are referred to as frequency hypotheses.

For each frequency hypothesis, a separate decision variable |d[k,i]| is obtained, which depends not only on k, but also on an index i, wherein i refers to an $i^{th}$ frequency. The maximum of all decision variables |d[k,i]| determined for a time step k is selected. The associated frequency index is referred to as i0[k].

The maximum is then compared with a threshold. If the maximum is above the threshold, a pilot sequence is detected and the frequency associated with the i0[k] index can be used as a rough estimate of the frequency offset.

For equidistant frequency hypotheses, this corresponds to the discrete Fourier transform (DFT) of the L values x[k]a[L−1], x[k−N]a[L−2] to x[k−(L−1)N]a*[0].

The DFT can be performed particularly efficiently in the form of the well-known fast Fourier transform (FFT), provided that L is a power of two. If L is not a power of two, the DFT length is rounded to the next higher power of two and a corresponding number of zeros is added to the L values so that an FFT can be applied.

To increase detection reliability, the L FFT input values can still be supplemented by any number of additional zeros.

Figure 4:
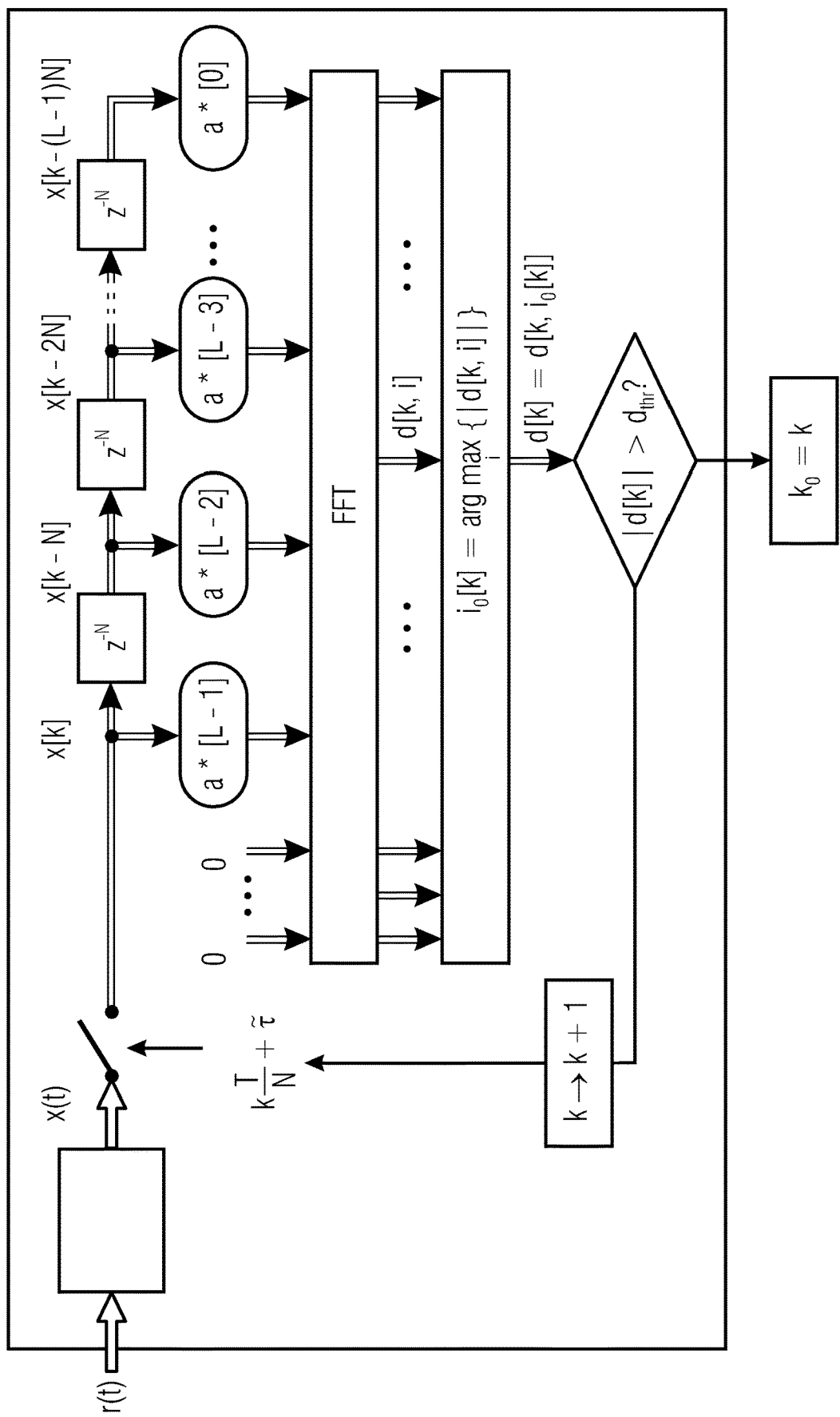
FIG. 4 shows a representation of a signal processing with unknown frequency offset.

The method is shown in FIG. 4.

The method is suitable for frequency offset up to almost half the symbol rate.

If a matched filter (a so-called optimum filter) is used, however, an energy loss of approx. 3 dB may be accepted at the frequency offset 0.5. This loss can be significantly reduced by widening the bandwidth of the receive filter (e.g. by a factor of 1.2). However, this results in a certain loss at low frequency offset (with a bandwidth extension of 1.2, the loss is approx. 0.8 dB).

A disadvantage of the FFT method is the relatively high computational effort. For an FFT alone, in the best case (if L is a power of two and no zeros are inserted) about 5 L(1+ldL) floating point operations (FLOPs) are to be performed per time step k [10]. This is significantly more than the 2 L FLOPs that may be used for summation in the correlation method at low frequency offset.

The FFT method is considered theoretically optimal in terms of the Neyman-Pearson criterion [11].

Phase Difference Correlation:

Conventional technology also describes a detection method at unknown frequency offset that comprises a significantly less signal processing effort.

Instead of the samples x[k], the products x*[k]x[k−N] of two samples at symbol spacings are used in each case, wherein the conjugated complex value respectively is to be taken from the most recent value.

Accordingly, in the sequence shown in FIG. 1, the symbols a[l] are replaced by the products a*[l]a[l−1]. The summation then only extends over L−1 values. If the pilot sequence is detected, the phase value of the decision variable d[k] is a measure of the estimated frequency offset.

A disadvantage is that the signal-to-noise power ratio in the decision variable is smaller than in the FFT method. There is therefore a higher probability that a pilot sequence will not be detected.

Figure 5:
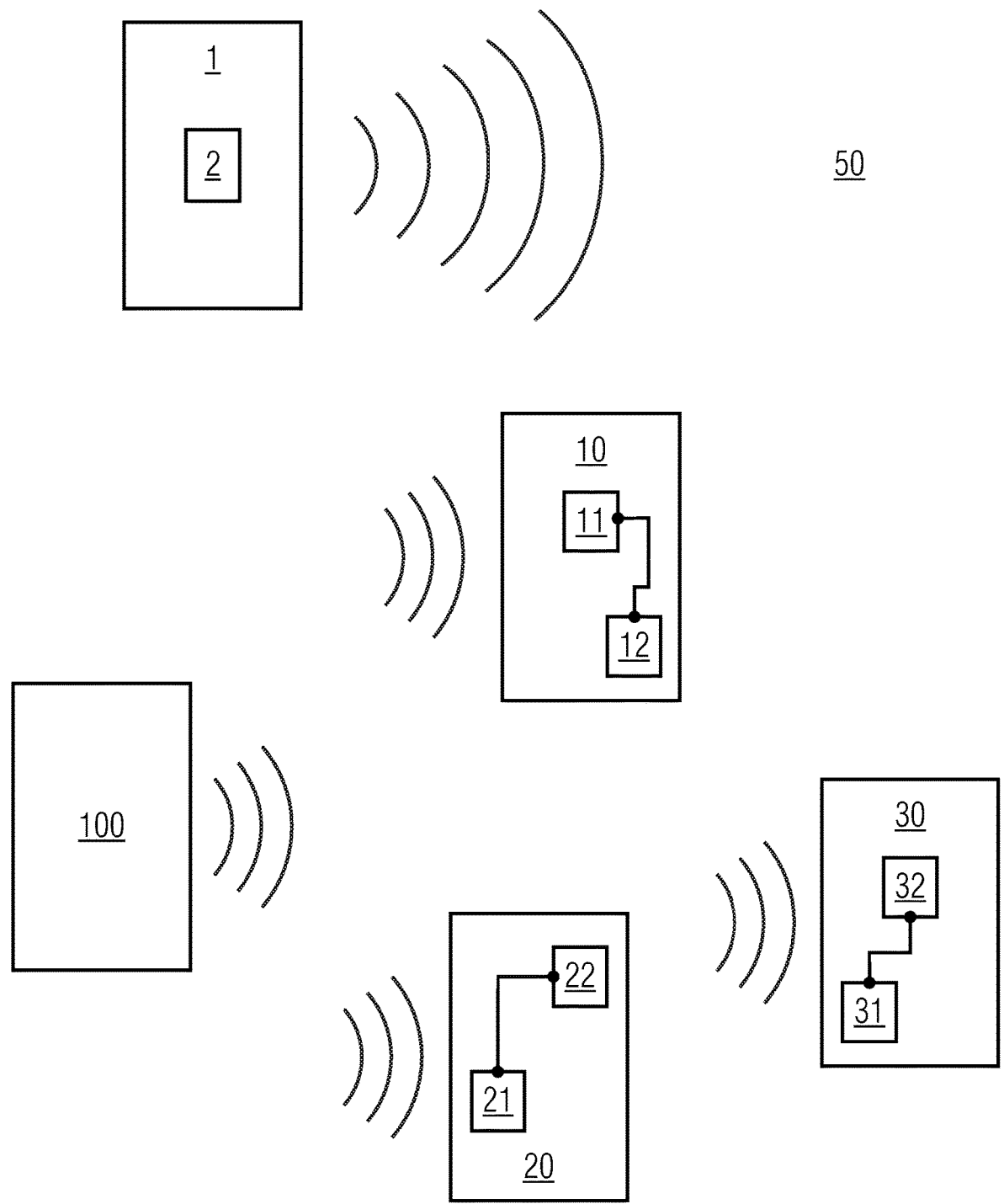
FIG. 5 shows a schematic representation of a system with several transmitters and receivers.

FIG. 5 shows a system 50, in which from presently two transmitters 1, 100 signals are transmitted and received by three receivers 10, 20, 30. The signals are emitted with pilot sequences so that the receivers 10, 20, 30 are accordingly configured to detect pilot sequences in the signals they receive. For this purpose, the receivers 10, 20, 30 each fall back to reference sequences.

A transmitter 100 is a transmitter according to conventional technology that transmits signals with pilot sequences. Such signals according to conventional technology can in particular be received and optimally processed by two of the three receivers 20, 30 shown.

The other transmitter 1 transmits signals whose pilot sequences are based on base sequences. In order to take advantage of this type of pilot sequence, the receiver identified with the reference sign 10 is particularly configured.

The transmitter 1 has a signal generator 2 which generates the signals to be transmitted and whose properties are described in the following in connection with FIG. 6, in particular with regard to the provision of the respective pilot sequence. In particular, there are pilot sequences with symbol repetition. The signals to be transmitted include, for example, not only the respective pilot sequence but also data, e.g. originating from sensors or relating to the properties of the transmitter, etc.

Figure 6:
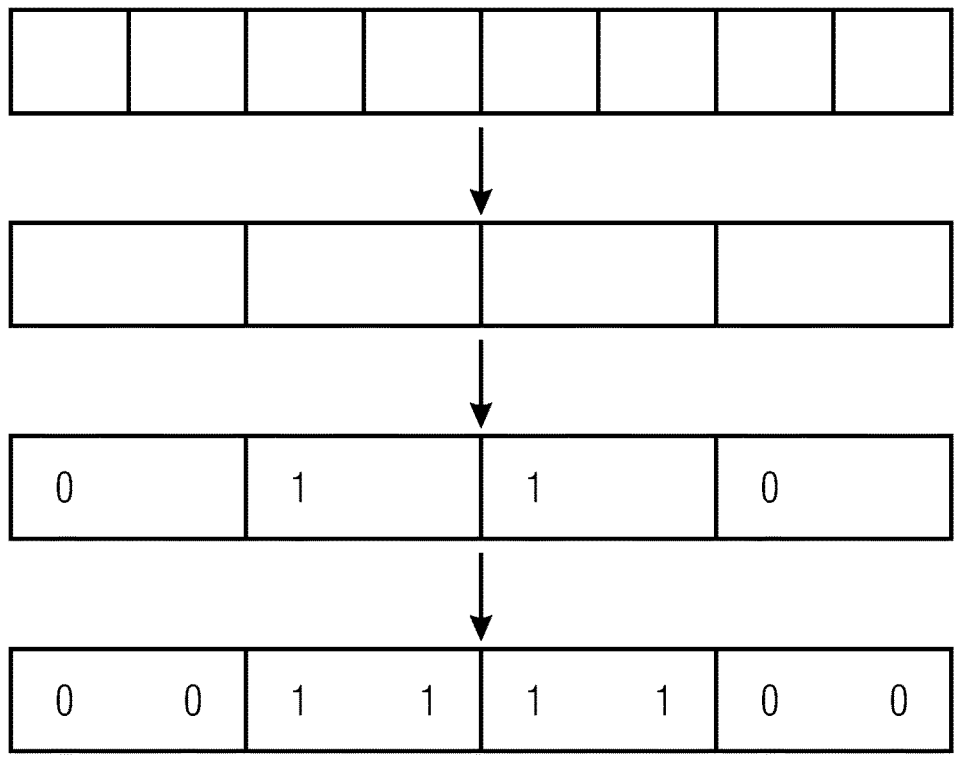
FIG. 6 shows a visual representation of generating a pilot sequence from a base sequence.

FIG. 6 schematically shows a pilot sequence with eight symbols in the top row, i.e. L=8 for the length L. This pilot sequence is to be generated from a base sequence comprising several base sequence symbols.

Generating the pilot sequence is carried out such that the base sequence symbols are successively repeated several times. In the example shown, each base sequence symbol is to be repeated once. Alternatively, it can be formulated that each base sequence symbol appears twice in succession as a pilot sequence symbol. For (R−1) repetitions, each base sequence symbol is present R times. Here applies: R=2.

Therefore, to obtain eight pilot sequence symbols, four base sequence symbols may be used for a repetition (L/R=8/2=4). Thus, the base sequence has a length of four. The binary base sequence symbols are given in the example in the following order: 0110. These base sequence symbols are entered in the third row of FIG. 6. According to the above notation, the symbols are: a[0]=0; a[1]=1; a[2]=1 and a[3]=0.

By doubling the base sequence symbols, the pilot sequence as shown in the lower row results in: 00111100.

In one configuration, the individual base sequence symbols, which are repeated as often as needed—especially in accordance with a mapping, e.g. BPSK—are provided with a phase factor.

With a pilot sequence length of eight symbols, the following basic sequences are characterized by an advantageous autocorrelation, which significantly simplifies the evaluation. These are the base sequences:
0010,
1101, 0100,
1011.

This results in the following four sequences:
00001100,
11110011,
00110000,
11001111

If a phase factor is added (in the example 180° in each case), wherein the order of the phase factors within the symbol blocks, which result from the repetitions of the base sequence symbols, is the same, the following pilot sequences are obtained in an arrangement after a subsequent inverse map ping:
01011001,
10100110,
10011010,
01100101.

The intermediate step is described in the following using complex symbols.

Figure 7:
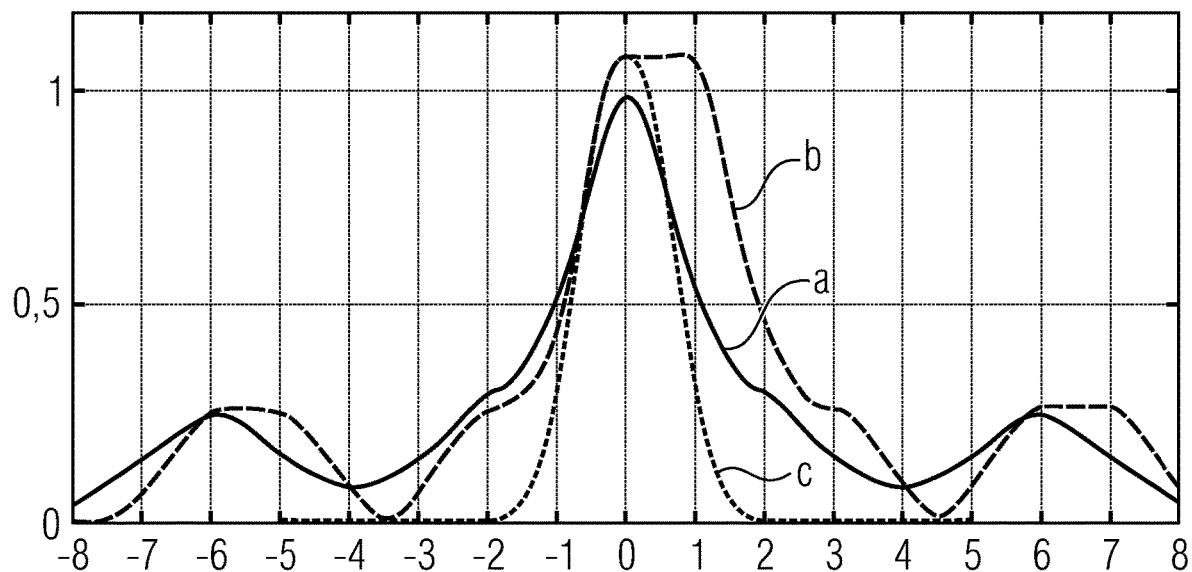
FIG. 7 shows a diagram with the magnitude of correlation functions for MSK modulation with matched filter receiver for a pilot sequence length of eight symbols.

FIG. 7 shows the amount of correlation functions during MSK modulation with matched filter receiver. The line a is the full correlation. The line b is the partial correlation with R=2. The dotted line c is the ACF of the MSK basic pulse. The value $|\varepsilon_v|_{max}$ is the maximum systematic frequency estimate offset using the full correlation, wherein a sampling time error of −0.5 T to +0.5 T and a frequency offset of vT of the received signal between −0.4 to +0.4 was taken into account. In the example in FIG. 7, the value in each case is 0.027.

The following base sequences are advantageous for a pilot sequence length of L=12 with a repetition of the base sequence symbols:
000101,
001011,
001101,
010001.

The following advantageous pilot sequences in particular result from the phase factors:

| base sequence a[0 ... 5] | Complete sequence or pilot sequence a[0 ... 11] | \| Max.εv |
|---|---|---|
| 000101 | 000000110011 | 0.022 |
|  | 111111001100 |  |
|  | 110011000000 |  |
|  | 001100111111 |  |
|  | 010101100110 | 0.022 |
|  | 101010011001 |  |
|  | 011001101010 |  |
|  | 100110010101 |  |
| 001011 | 000011001111 | 0.0046 |
|  | 111100110000 |  |
|  | 010110011010 | 0.0046 |
|  | 101001100101 |  |
| 001101 | 000011110011 | 0.015 |
|  | 111100001100 |  |
|  | 110011110000 |  |
|  | 001100001111 |  |
|  | 010110100110 | 0.015 |
|  | 101001011001 |  |
|  | 011001011010 |  |
|  | 100110100101 |  |
| 010001 | 001100000011 | 0.0085 |
|  | 110011111100 |  |
|  | 110000001100 |  |
|  | 001111110011 |  |
|  | 011001010110 | 0.0085 |
|  | 100110101001 |  |
|  | 011010100110 |  |
|  | 100101011001 |  |

Figure 8:
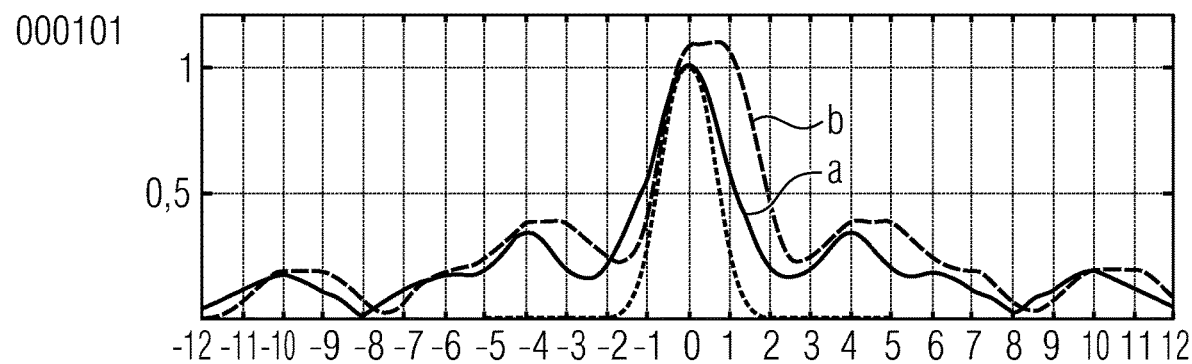
FIG. 8 shows a diagram with the magnitude of correlation functions for MSK modulation with matched filter receiver for a pilot sequence length of 12 symbols.
Figure 8:
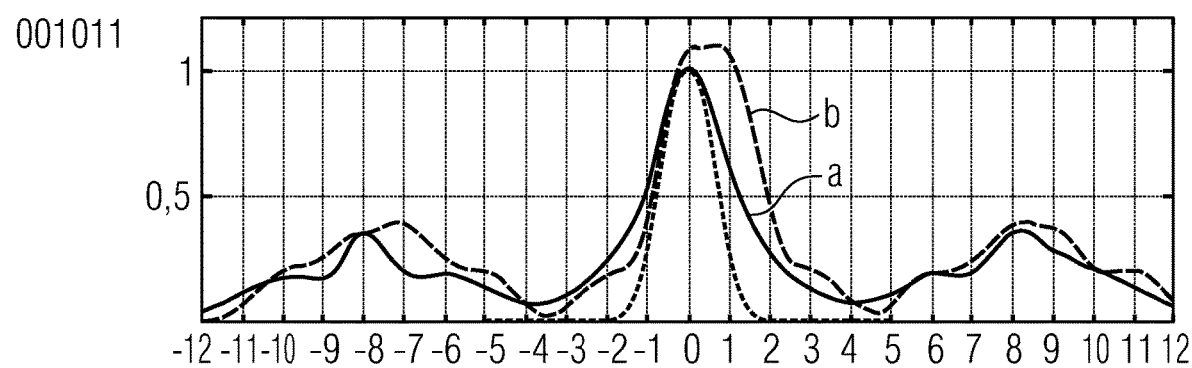
Figure 8:
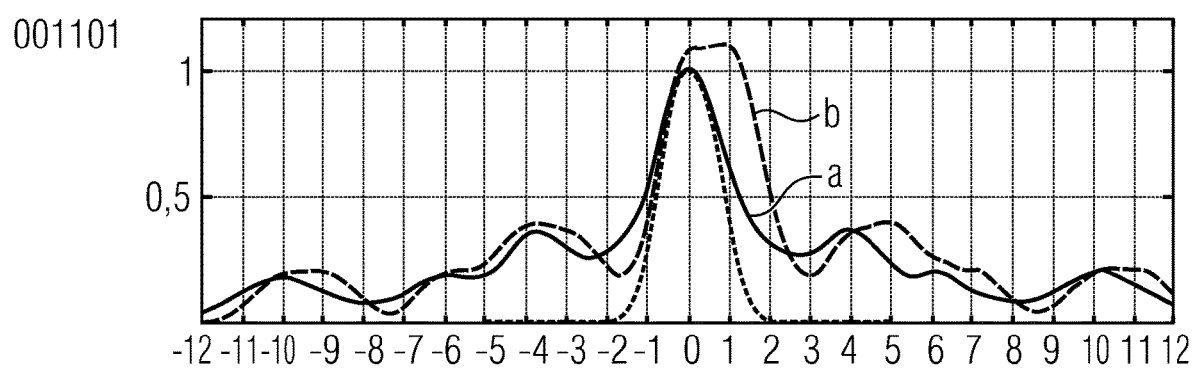
Figure 8:
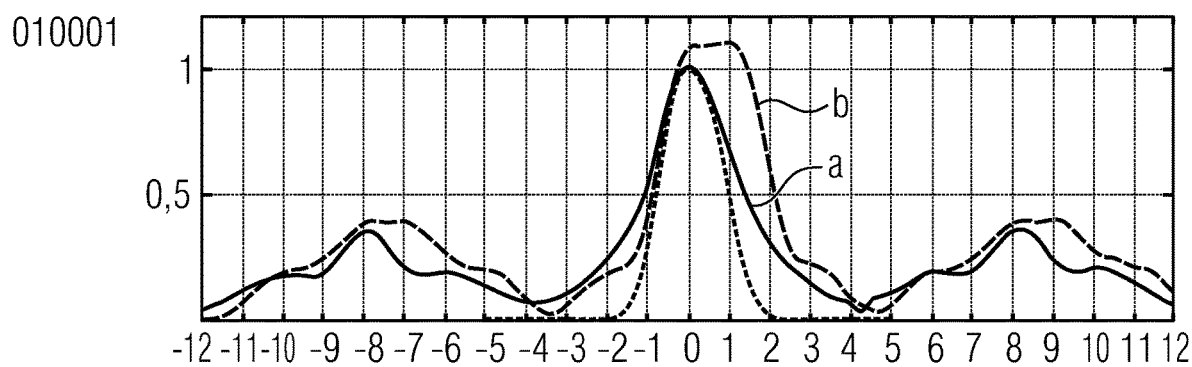

Similar to FIG. 7, FIG. 8 shows the magnitude of the correlation functions of the four base sequences, wherein the corresponding base sequence in each case is next to the diagram. A line a of the full correlation is marked in each case and a line b of the partial correlation is marked with R=2. The dotted line is the ACF of the MSK basic pulse.

Thus, in one configuration, pilot sequences with the following properties are used:

Within subsequences of the pilot sequence with each R pilot symbol, there are symbols which are identical except for one phase factor $e^{j\varphi}$. The phase factor for the first repeated symbol is the same in all subsequences. It is also the same for the second repetition in all subsequences, etc. In one configuration the phase factor is different for different repetitions and identical in another configuration. Thereby, R is a divider of L. Phase factors which are part of the modulation alphabet are advantageous (with Quadrature Phase-Shift Keying, QPSK, e.g. "1, j, −1, −j", which corresponds to the phase factors 0°, 90°, 180°, and 270°).

In one configuration, the data is then mapped with the modulation alphabet before introducing a phase factor. This is, for example, a BPSK (binary PSK).

In the example of FIG. 6, the base symbols are defined as [0, 1, 1, 0], so that after a BPSK (i.e. with the mapping that a 0 becomes a −1 and a 1 becomes a +1) the symbols read: [−1, −1, +1, +1, +1, +1, −1, −1].

If the mentioned phase factor for the symbol repetition will be inserted, which is 90° here, the pilot sequence is: [−1, −j, +1, +j, +1, +j, −1, −1j].

This type of pilot sequence offers the great advantage that in a detection with subsampling (see in FIGS. 7 to 10 line b respectively) a time invariance over the repeat length R is achieved. Thereby, the computing effort of the detection in the receiver can be reduced.

The pilot sequence can be constructed, for example, by selecting a base sequence of length L/R and repeating each symbol (R−1) times. The $r^{th}$ repetition (r=1, 2, ..., R−1) in each subsequence is multiplied by a phase factor in a configuration, wherein $\varphi_r$ is freely selectable between 0 and $2\pi$.

An advantage over the pilot sequences previously used in conventional technology is that methods with significantly reduced signal processing efforts can be used for detection.

The disadvantage is the limited sequence selection. Thereby, the ACF properties of the entire pilot sequence can also be set less optimally than with free selection of all symbols. Experience has shown, however, that the effects on frequency, time and phase estimation are negligible.

In order to further improve the detection of the pilot sequences on the receiver side, in an additional configuration of the signal generator 2 (see FIG. 5) the pilot sequences are provided with supplementary symbols which are preceded and/or followed by the symbol blocks of the repetitions of the base sequence symbols. This results in pilot sequences with symbol repetitions which are preceded and/or appended by symbol(s).

In one configuration, it is provided that a subsequence of length L−1 or L−2 from the entire pilot sequence of length L to be generated has the properties described above. The prerequisite is that R is a divider of L−1 or L−2 as the number of base sequence symbols per symbol block.

In order to construct the pilot sequences with the supplementary symbols, the symbols of a base sequence of length (L−1)/R or (L−2)/R are repeated (R−1) times so that the symbols are available R times. Subsequently, a supplementary symbol or several (at least two) supplementary symbols are preceded or followed.

One advantage is that the ACF properties of the entire pilot sequence can be better adapted to the ideal properties by freely selecting a border symbol or two border symbols (as an alternative designation for supplement symbols).

A disadvantage is that the proportion of the base sequence in the entire pilot sequence decreases. This results in a loss of signal-to-noise ratio when the receiver is subsampled (see below).

If x supplementary symbols are generally used for a total length of L symbols of a pilot sequence, then a subsequence of the length (L-x) has the property that it results from the repeated base sequence symbols.

In the following embodiments, there are two supplementary symbols which have the form 11, 00, 01 or 10. Thereby, either both supplementary symbols are preceded by the symbol blocks or both follow the symbol blocks or one supplementary symbol is preceded and the other supplementary symbol is followed.

Due to the supplementary symbols, the number of symbols of the base sequences for the specified length of the pilot sequences is simultaneously reduced.

For a length of the pilot sequence with L=8 with a single repetition of each base sequence symbol (thus R=2) and two supplementary symbols, three base sequence symbols may be used which have the following form: 001. With the supplementary symbols 01, 10, 00, and 11 and the phase factors, the following advantageous pilot sequences result, wherein the supplementary symbols are each separated from the actual core of the pilot sequence, which is formed by the symbol blocks, by a vertical line:

| Base sequence a[0 ... 2] | Entire sequence a[0 ... 7] | $\|\varepsilon v\|_{max}$ |
|---|---|---|
| 001 | 00\|0011\|01 | 0.037 |
| | 11\|1100\|10 | |
| | 10\|1100\|00 | |
| | 01\|0011\|11 | |
| | 01\|0110\|00 | 0.037 |
| | 10\|1001\|11 | |
| | 00\|0110\|10 | |
| | 11\|1001\|01 | |
| 001 | 01\|0000\|11 | 0.024 |
| | 10\|1111\|00 | |
| | 11\|0000\|10 | |
| | 00\|1111\|01 | |
| | 00\|0101\|10 | 0.024 |
| | 11\|1010\|01 | |
| | 01\|1010\|00 | |
| | 10\|0101\|11 | |
| 001 | 1\|000011\|0 | 0.011 |
| | 0\|111100\|1 | |
| | 0\|110000\|1 | |
| | 1\|001111\|0 | |
| | 0\|010110\|0 | 0.011 |
| | 1\|101001\|1 | |
| | 0\|011010\|0 | |
| | 1\|100101\|1 | |

Figure 9:
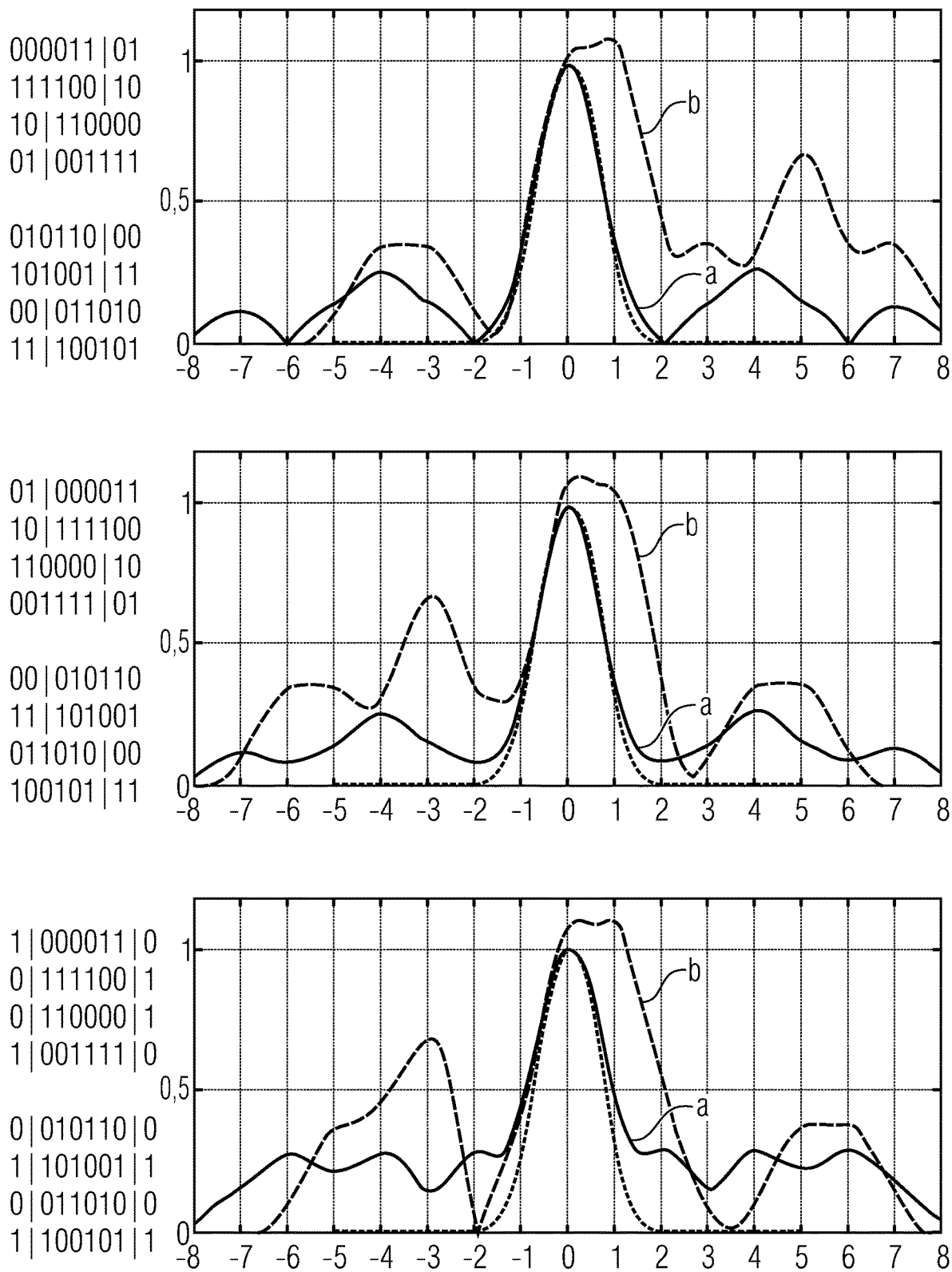
FIG. 9 shows a diagram with the magnitude of correlation functions for MSK modulation with matched filter receiver for a pilot sequence length of eight symbols with supplementary symbols.

FIG. 9 shows the respective magnitude of the correlation functions, wherein the corresponding pilot sequences is next to the diagram. A line a of the full correlation is marked and a line b of the partial correlation is marked with R=2. The dotted line is the ACF of the MSK basic pulse, respectively.

For a length of the pilot sequence with L=12 for a single repetition of each base sequence symbol (hence R=2) and two supplementary symbols, five base sequence symbols may be used which have the following form: 00010 (i.e. for the base sequence symbols: a[0]=a[1]=a[2]=0; a[3]=1; a[4]=0). With the supplementary symbols 01, 10, 00 and 11 and the phase factors, the following pilot sequences result, wherein the supplementary symbols are separated from the symbol blocks by a vertical line as before:

| Base sequence a[0 ... 4] | Everall sequence = pilot sequence a[0 ... 11] | $\|\varepsilon v\|_{max}$ |
|---|---|---|
| 00010 | 1\|00000011001\|1 | 0.012 |
| | 0\|11111110011\|0 | |
| | 1\|00110000001\|1 | |
| | 0\|11001111111\|0 | |
| | 0\|01010110011\|1 | 0.012 |
| | 1\|10101001100\|0 | |
| | 1\|10011010100\|0 | |
| | 0\|01100101011\|1 | |
| | 00000011001\|10 | 0.025 |
| | 11111110011\|01 | |
| | 01\|0011000000 | |
| | 10\|1100111111 | |
| | 0101011001\|11 | 0.025 |
| | 1010100110\|00 | |
| | 11\|1001101010 | |
| | 00\|0110010101 | |
| | 01\|0000001100 | 0.010 |
| | 10\|1111110011 | |
| | 0011000000\|10 | |
| | 1100111111\|01 | |
| | 00\|0101011001 | 0.010 |
| | 11\|1010100110 | |
| | 1001101010\|00 | |
| | 0110010101\|11 | |

Figure 10:
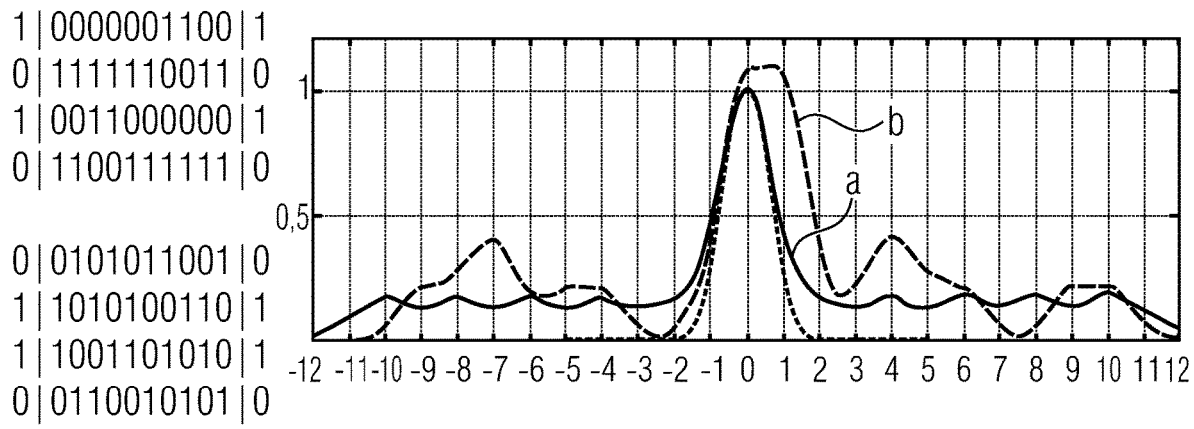
FIG. 10 shows a diagram with the magnitude of correlation functions for MSK modulation with matched filter receiver for a pilot sequence length of 12 symbols with supplementary symbols.
Figure 10:
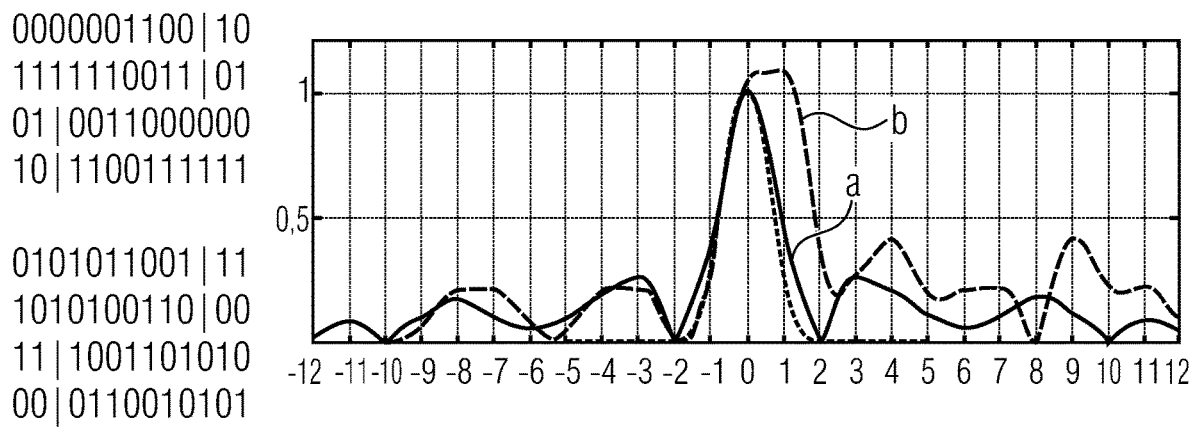
Figure 10:
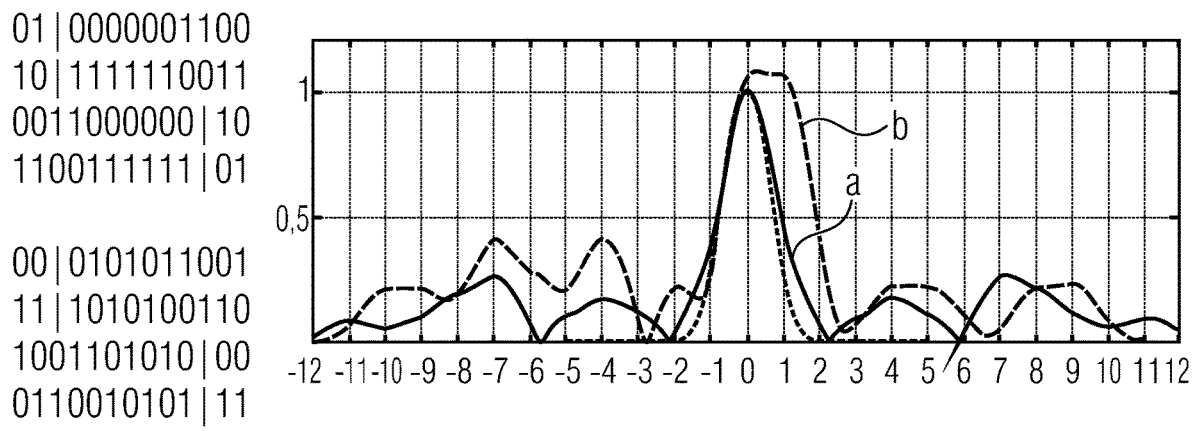

FIG. 10 shows the magnitude of the correlation functions, with the corresponding pilot sequences next to the diagram. A line a of the full correlation and a line b of the partial correlation are marked with R=2. The dotted line is the ACF of the MSK basic pulse.

In the following, the system of FIG. 5 and in particular the receivers 10, 20, 30 shown there are described.

The receiver 10 of FIG. 5 matching the described transmitter 1 has a signal evaluation device 11 which has access to an internal data memory 12.

The signal evaluation device 11 first carries out an initial evaluation of the received signals. If, for example, it is known that the transmitter 1 simply repeats the symbols of the base sequence, the signal evaluation device 11 only samples every second point of the received signal or evaluates only every second sample or only samples in half symbol clock (at a higher sampling rate, less than every second sample is used). This results in a reduced pilot sequence which the signal evaluation device 11 compares with base sequences stored in the data memory 12 (in a cross-correlation configuration). This results in an evaluation result that indicates whether the reduced pilot sequence matches a base sequence, i.e. whether a pilot sequence exists at all.

In the positive case, the signal evaluation device 11 subjects the received signal to a renewed and here in particular second evaluation, in which it is again checked whether a pilot sequence is present. For this, the sampling rate is increased or more samples are evaluated.

Overall, a reduction of the correlation rate for continuous detection of a pilot sequence takes place.

In one configuration for the detection of a pilot sequence, a modification of the known methods (e.g. correlation method with low frequency deviation or FFT method at unknown frequency offset) is carried out which has the following features:

The correlation is performed only for each $RN^{th}$ (where N is the oversampling factor and R is a natural number equal to the occurrence of the symbols of the base sequence or equal to the number of repetitions+1) sample of the sample sequence. In addition, only every RN$^{th}$ value of the filtered receive signal is used to calculate the decision variables.

The correlation length is reduced to the length of the base sequence contained in the pilot sequence. For the pilot sequences described above, the correlation is reduced to L/R values. For the pilot sequences with supplementary symbols it is reduced to (L−1)/R or (L−2)/R symbols or generally to (L−x)/R symbols for x supplementary symbols.

An advantage is the reduction of the signal processing effort compared to a full correlation with N-fold oversampling.

For the correlation method described in conventional technology (e.g. correlation method with low frequency offset), the effort (measured in real-valued floating-point operations) is reduced by about the factor $1/(NR^2)$. For N=2 and R=2, the reduction factor is e.g. $1/(2*2^2)=1/8$.

For the FFT method described in conventional technology, the effort is approximately reduced by the factor $1/(NR2)*\{1-5ld(R)/(9+5ld(L))\}$ when using an FFT of length L or L/R in correlation with the base sequence. For N=2, R=2 and L=8, the reduction factor is e.g. 1/10.

A disadvantage is that a certain loss in the signal-to-noise ratio (SNR) in the decision variable may be accepted, since one correlates with a smaller number of symbols. The loss for sequences without additional symbols is about 10 log R dB, hence about 3 dB at R=2. This disadvantage can be compensated by using correspondingly longer (exactly R times as long) pilot sequences or by using several subsequences.

It is recommended to perform the exact estimation of frequency offset, optimum sampling time and phase in a second step after detection based on the full pilot sequence with N-fold oversampling, wherein normally N=2 is sufficient. In order to be able to access the sampled values after detection, in one configuration sampling with an oversampling factor N already may be used during the detection phase. As a result, the ADC continuously samples with a sampling rate of N/T values per second. During the detection phase, the signal processing effort is primarily reduced.

The receiver 20 of FIG. 5 has a processing device 21. The processing device 21 is configured to divide the pilot sequence of the received signal into at least two subareas which partially overlap each other. Each subarea is correlated with subareas of reference sequences stored in the data memory 22. The resulting partial results are combined to an overall result regarding the pilot sequence of the received signal.

Thus, the partial correlation is extended in this configuration.

In [3] a method for improved detection under frequency offsets of a telegram with several (sub-) pilot sequences is described. A pilot sequence is divided into several subareas, with each sub are being correlated separately. The subdivision of the pilot sequence into individual subareas or subsequences is shown in FIG. 11.

Figure 11:
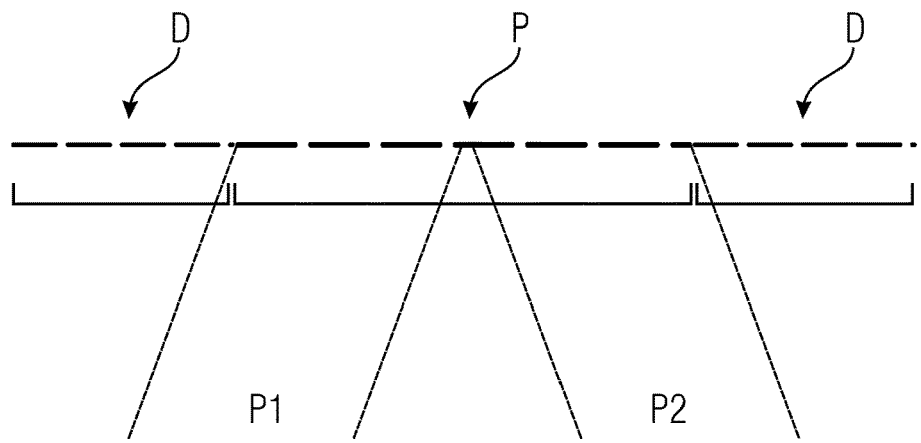
FIG. 11 shows a schematic representation of the division of a pilot sequence into two subareas without overlap.

In FIG. 11, a pilot sequence identified by P is located between two data sequences identified by D. The pilot sequence is divided into two discrete subareas, P1 and P2, for further evaluation.

In this method, however, a part of the information that lies between the two subareas P1, P2 is discarded.

Figure 12:
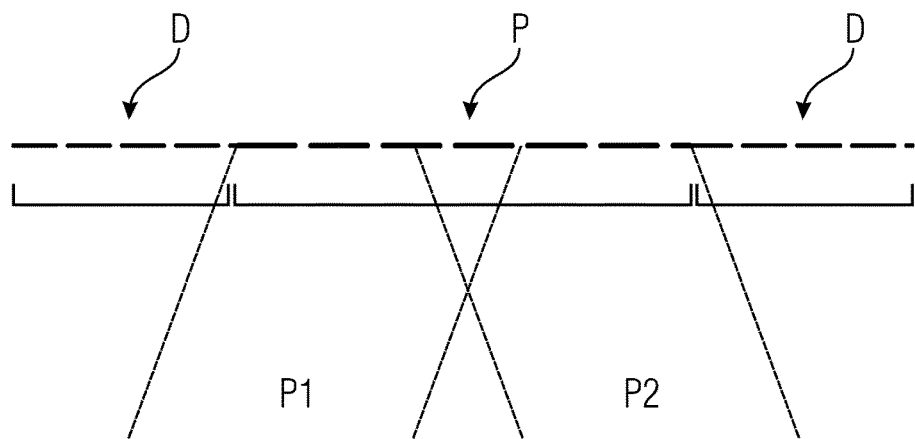
FIG. 12 shows a schematic representation of the division of a pilot sequence into two subareas with overlap.

To improve the detection capability, overlapping areas are defined. For example, in FIG. 12 the two pilot sequence parts from FIG. 11 are defined with an overlap. This increases the length of the two pilot sequence parts.

However, by extending both parts, the susceptibility of the detection to frequency offsets increases. In order to achieve a constant performance compared to frequency offsets, the length of the pilot sequence parts remain the same.

Figure 13:
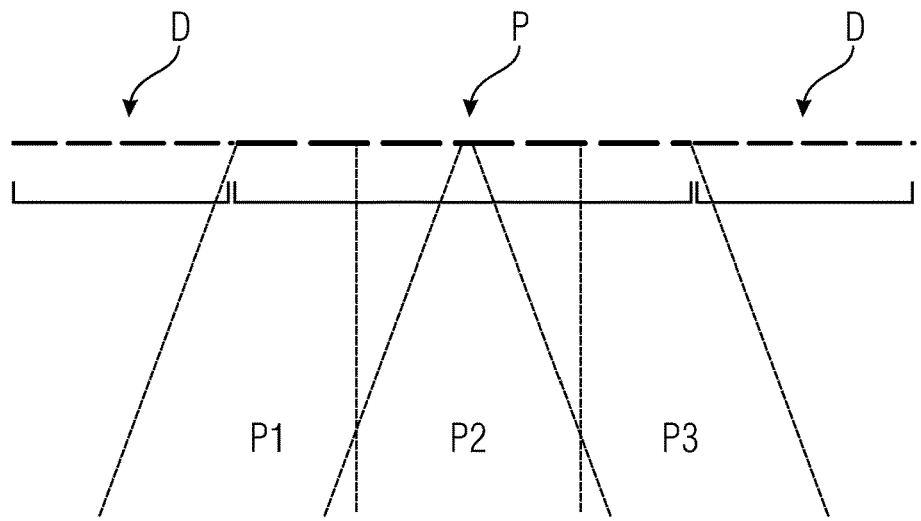
FIG. 13 shows a schematic representation of the division of a pilot sequence into three subareas with overlap.

In FIG. 13, for example, this is achieved by dividing the pilot sequence into more than two subareas. In the configuration shown, there are three sub-areas: P1, P2 and P3.

The partial results are added incoherently, so that frequency offsets have a smaller influence.

In a further configuration, a normalization of the overlap area with partial correlation is carried out.

The configuration described above improves the performance of the correlation against noise compared to the method described in [3]. If, however, interference occurs in the channel in which the signals are transmitted, a negative effect is produced by the overlapping areas.

Each symbol within an overlap area is used at least twice in a correlation, however, symbols outside the overlap areas are used only once. This means that symbols within the overlap areas are weighted higher than symbols outside them. If an interferer falls within an overlapping area, it has a greater influence than if it does not fall within the overlapping area.

In order to avoid this problem, in one configuration, the symbols within an overlapping area are given a weaker weighting by means of normalization, or symbols outside the areas are given a stronger weighting. The weighting therefore depends on how many subareas a symbol belongs to.

The weighting factors depend on the number of selected subareas and the overlap areas.

The receiver identified by the reference sign 30 has a transformation device which separately determines a Fourier transform for at least two subpilot sequences of a common pilot sequence or for at least two subpackets of the pilot sequence. Thereby, the subpackets are overlapping or disjunctive.

The transformation device 31 adds the determined Fourier transform incoherently and generates an addition result using the reference sequences stored here in a data memory 32. The addition result then allows an evaluation result to be generated for the pilot sequence.

In one configuration, this is an optimized detection with the DFT method in combination with partial correlation and therefore an optimization of the method shown in FIG. 4.

The basic principle of the processing of the receiver is discussed below.

Conventional technology describes an FFT method (DFT method), which allows by using little computational effort to detect the pilot sequence at unknown frequency offset in the range of +−0.5 times the symbol rate.

A disadvantage of the DFT method is that it cannot be used in partial correlation or with a distributed synchronization sequence. This problem is bypassed by the addressed receiver 30.

Instead of calculating the DFT (FFT) over the entire synchronization sequence, independent DFTs or FFTs are calculated for all subsequences of the partial correlation (thus the subpackets of the pilot sequence). The overall result for the detection results from the non-coherent addition of the frequency lines of the individual FFTs or DFTs. Examples of non-coherent addition are absolute addition, absolute square addition or an approximation of this methodology.

The advantage is that by using an FFT, the "correlation" is performed in parallel on several frequencies.

A closer look at the FFT (DFT) operation shows that an FFT performs a frequency shift (in parallel on several different offsets). These frequency shifted lines are then added by summation. The search area of this method is a +−0.5·sampling rate (corresponds to the symbol rate).

If the resolution of the FFT is not sufficiently accurate, a zero padding of the input data for the FFT/DFT takes place. This increases the number of frequency lines of the FFT/DFT. It should be noted here the zeros are set either at the beginning or at the end of the FFT.

As an alternative to zero padding, an interpolation between the maximum and the neighboring positions is carried out in an alternative configuration.

An advantage is that, compared to the conventional FFT method, even split synchronization sequences can be detected relatively easily, since the non-coherent addition of the FFTs/DFTs eliminates the need for coherence between the synchronization sequences.

Figure 14:
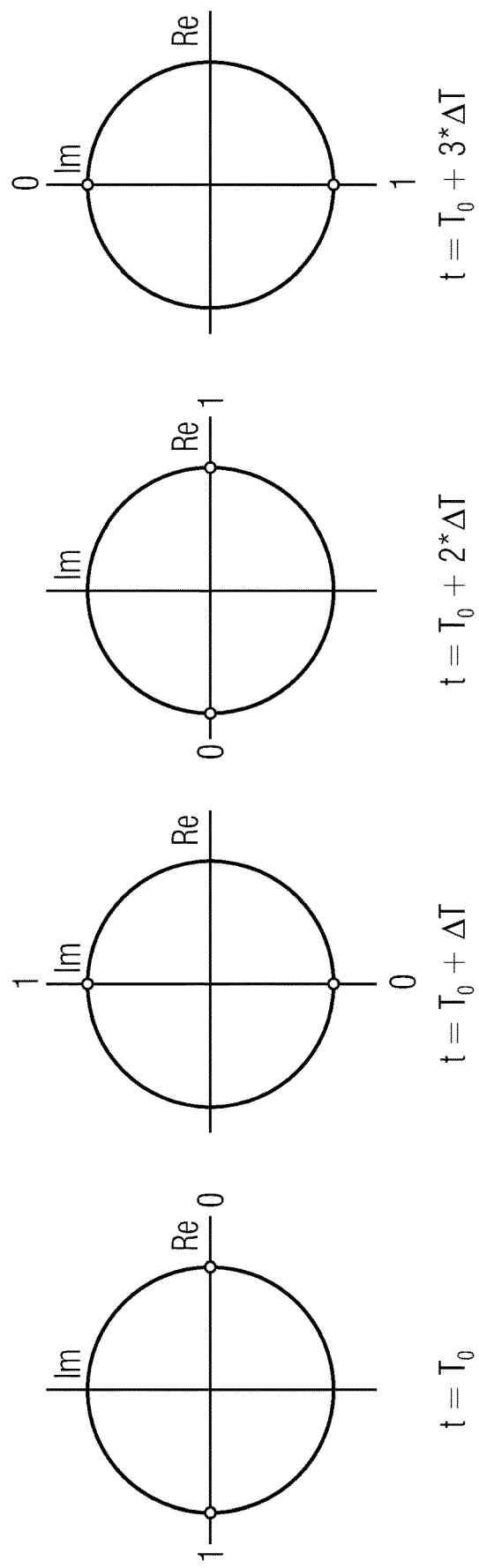
FIG. 14 shows a schematic representation of an example of a modulation used.

The sequences mentioned in the embodiments relate to an MSK modulation as an example of mapping that has the following properties:

MSK with Precoding (Matlab 'Non-Diff'):
  rotation −pi/2 each time step (==right==clockwise)
  rotating for data==1: +pi/2==left==counterclockwise
  for data==0: −pi/2==right==clockwise FIG. 14 shows the illustration of the MSK modulation. Shown are the possible constellation points of the MSK with precoding (in MATLAB also known as non-diff MSK).

The symbols to be sent are thereby divided into groups of four symbols, wherein the first symbol is transmitted at time $T_0$. Accordingly, the constellation point +1+0j is selected for a binary zero at time $T_0$ and the constellation point −1+0j is selected for a binary one. The time $T_0+\Delta T$ is selected for the following symbol. The constellation points thus result in 0+1j (binary one) and 0−1j (binary zero). For the following two times, the constellation points are calculated in the same way. After four symbols have been mapped to the constellation points, the calculation starts again at time $T_0$.

Although some aspects have been described in connection with a device, it is understood that these aspects also represent a description of the corresponding method so that a block or component of a device is also to be understood as a corresponding method step or as a feature of a method step. Analogously, aspects described in connection with or as a method step are also a description of a corresponding block or detail or feature of a corresponding device. Some or all of the method steps can be performed by a hardware device (or using a hardware device), such as a microprocessor, a programmable computer, or an electronic circuit. In some embodiments, some or more of the most important method steps can be carried out by such an apparatus.

Depending on certain implementation requirements, embodiments of the invention may be implemented in hardware or in software or at least partially in hardware or at least partially in software. The implementation may be carried out using a digital storage medium, such as a floppy disk, a DVD, a BluRay disk, a CD, a ROM, a PROM, an EPROM, an EEPROM or a FLASH memory, a hard disk or another magnetic or optical memory, on which electronically readable control signals are stored which can interact or interact with a programmable computer system to carry out the respective method. Therefore, the digital storage medium may be computer-readable.

Some embodiments according to the invention thus include a data carrier containing electronically readable control signals capable of interacting with a programmable computer system such that one of the methods described herein is carried out.

In general, embodiments of the present invention may be implemented as a computer program product with program code, the program code being effective to perform one of the methods when the computer program product runs on a computer.

The program code can, for example, also be stored on a machine-readable carrier.

Other embodiments include the computer program for carrying out any of the methods described herein, wherein the computer program is stored on a machine-readable medium. In other words, an embodiment of the inventive method is thus a computer program that includes a program code to perform one of the methods described herein when the computer program runs on a computer.

A further embodiment of the inventive methods is thus a data carrier (or a digital storage medium or a computer-readable medium) on which the computer program for the implementation of one of the methods described herein is recorded. The data carrier or digital storage medium or computer-readable medium is typically tangible and/or non-volatile.

A further embodiment of the inventive method is thus a data stream or a sequence of signals which represent the computer program for the execution of one of the methods described herein. The data stream or the sequence of signals can, for example, be configured to be transferred via a data communication link, for example, via the Internet.

A further embodiment includes a processing device, such as a computer or programmable logic device, configured or adapted to carry out any of the methods described herein.

Another embodiment includes a computer on which the computer program for carrying out one of the methods described herein is installed.

A further embodiment according to the invention comprises a device or system adapted to transmit a computer program to a receiver to execute at least one of the methods described herein. The transmission can take place electronically or optically, for example. For example, the receiver may be a computer, a mobile device, a storage device, or a similar device. For example, the device or system may include a file server for transmitting the computer program to the receiver.

In some embodiments, a programmable logic device (such as a field-programmable gate array, FPGA) can be used to carry out some or all of the functionality of the methods described herein. In some embodiments, a field-programmable gate array may interact with a microprocessor to carry out one of the methods described herein. In general, in some embodiments, the methods are executed by any hardware device. This can be universal hardware, such as a computer processor (CPU), or hardware specific to the process, such as an ASIC, or a microprocessor, such as an ARM architecture.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Z. Y. Choi and Y. H. Lee, "Frame synchronization in the presence of frequency offset," Communications, IEEE Transactions on, vol. 50, no. 7, pp. 1062-1065, 2002.

[2] Sust, M. K.; Kaufmann, R. F.; Molitor, F.; Bjornstrom, G. A.: Rapid acquisition concept for voice activated CDMA communication. In: IEEE Global Telecommunications Conference, 1990 Bd. 3, 1990, S. 1820 #1826
[3] International patent application "Optimized Preamble and Methods for Interference Robust Packet Detection for Telemetry Applications" (PCT/EP2016/057014)
[4] G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013
[5] G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015.
[6] Wolfgang Koch, Script for the Seminar "Empfängersynchronisation (Receiver Synchronization) at Fraunhofer IIS, 10.06.2015-15.06.2015
[7] Uwe Lambrette, Ralf Mehlan and Heinrich Meyr, Comparison of Demodulation Techniques for MSK, RWTH Aachen, https://www.ice.rwth-aachen.de/fileadmin/publications/Lambrette95TIRR.pdf, last retrieved: 19.09.2016
[8] Kay, Steven M.: Fundamentals of Statistical Signal Processing: Detection theory. Upper Saddle River, N.J.: Prentice Hall PTR, 1998. ISBN 9780135041352
[9] Umberto Mengali, Aldo N. D'Andrea: "Synchronization Techniques for Digital Receivers" Plenum Press, 1997, ISBN 0-306-45725-3
[10] Walter Kellermann: "Digital Signal Processing", lecture notes from WS 2016/17, Chair in Multimedia Communication and Signal Processing (LMS) at the Friedrich-Alexander-University Erlangen-Nuremberg.
[11] Steven M. Kay: "Fundamentals of Statistical Signal Processing—Vol. 2: Detection Theory", Prentice Hall, 1998, ISBN: 0-13-345711-7
[12] Z. Y. Choi and Y. H. Lee, "Frame synchronization in the presence of frequency offset", IEEE Transactions on Communications, vol. 50, no. 7, pp. 1062-1065, 2002.

The invention claimed is:

1. A transmitter for transmitting signals, the transmitter comprising:
a signal generator configured to generate the signals to be transmitted, each signal comprising one pilot sequence comprising several pilot sequence symbols,
wherein the signal generator is configured to provide the pilot sequence based on a base sequence comprising several base sequence symbols,
wherein the signal generator provides the pilot sequence with L pilot sequence symbols by repeating each base sequence symbol R−1 times in succession so that each base sequence symbol is present R times,
wherein L is a natural number, and
wherein R is a natural number greater than or equal to two and is a divisor of L,
wherein the base sequence is configured such that a correlation of the pilot sequence with a transmission signal formed from the pilot sequence comprises a main maximum,
wherein the pilot sequence comprises eight or twelve pilot sequence symbols,
wherein, in the case where the pilot sequence comprises eight pilot sequence symbols, the base sequence comprises one of the following forms:
0010 or 1101 or 0100 or 1011, and
wherein the zeros and ones are each the binary base sequence bits,
wherein, in the case where the pilot sequence comprises twelve pilot sequence symbols, the base sequence comprises one of the following forms or forms acquired therefrom by reversing the bit order:
000101, 001011, 001101, 010001, 111010, 110100, 110010 or 101110, and
wherein the zeros and ones are each the binary base sequence bits.

2. The transmitter as claimed in claim 1,
wherein the signal generator generates symbol blocks in the pilot sequence which each comprise a base sequence symbol and its repetitions, and
wherein the signal generator generates the pilot sequence such that the symbol blocks of the base sequence symbols immediately follow one another in an order of the base sequence symbols within the base sequence.

3. The transmitter as claimed in claim 1,
wherein the pilot sequence in the signal generator in the pilot sequence provides symbol blocks each comprising a base sequence symbol and its repetitions, and
wherein the signal generator provides the base sequence symbols with phase factors such that the phase factors of the respective $i^{th}$ occurrence of a base sequence symbol in a symbol block are the same for all symbol blocks, and
wherein i is a natural number between 1 and R.

4. The transmitter as claimed in claim 3, wherein the phase factors are components of a modulation alphabet.

5. The transmitter as claimed in claim 3,
wherein, in the case where the pilot sequence comprises eight pilot sequence symbols, the pilot sequence comprises one of the following forms or forms acquired therefrom by reversing the bit order:
01011001, 10100110, 10011010, 01100101, 00001100, 11110011, 00110000, 11001111, and
wherein the zeros and ones are each the pilot binary sequence bits.

6. The transmitter as claimed in claim 3,
wherein, in the case where the pilot sequence comprises twelve pilot sequence symbols, the pilot sequence comprises one of the following forms or forms acquired therefrom by reversing the bit order:
000000110011 or 111111001100 or 1100110000 or 001100111111 or 010101100110 or 101010011001 or 011001101010 or 100110010101 or 000011001111 or 111100110000 or 010110011010 or 101001100101 or 000011110011 or 111100001100 or 110011110000 or 001100001111 or 010110100110 or 101001011001 or 011001011010 or 100110100101 or 001100000011 or 110011111100 or 110000001100 or 001111110011 or 011001010110 or 100110101001 or 011010100110 or 100101011001, and
wherein the zeros and ones are each the pilot binary sequence bits.

7. The transmitter as claimed in claim 1,
wherein the signal generator provides the pilot sequence such that the pilot sequence comprises at least one supplement symbol,
wherein the signal generator provides symbol blocks in the pilot sequence each comprising a base sequence symbol and its repetitions, and
wherein the signal generator provides the pilot sequence in such a way that the at least one supplementary symbol precedes or follows the symbol blocks.

8. The transmitter as claimed in claim 7,
wherein the signal generator generates the pilot sequence such that the pilot sequence comprises at least two supplementary symbols, and
wherein the signal generator provides the pilot sequence such that at least one supplementary symbol of the at least two supplementary symbols precedes the symbol blocks and at least one other supplementary symbol of the at least two supplementary symbols follows the symbol blocks.

9. The transmitter as claimed in claim 7,
wherein, in the case that the pilot sequence comprises eight pilot sequence symbols, the base sequence comprises the form 001 and two supplementary bits are present which together comprise one of the following forms:
01 or 10 or 00 or 11, and
wherein the zeros and ones are respectively binary base sequence bits and the binary supplementary symbols.

10. The transmitter as claimed in claim 9,
wherein the pilot sequence comprises one of the following forms or forms acquired therefrom by reversing the bit order:
00001101 or 11110010 or 10110000 or 01001111 or 01011000 or 10100111 or 00011010 or 11100101 or 01000011 or 10100111 or 11000010 or 00111101 or 00010110 or 11101001 or 01101000 or 10010111 or 10000110 or 01111001 or 01100001 or 10011110 or 10011110 or 00101100 or 11010011 or 00110100 or 11001011, and
wherein the zeros and ones are each the pilot binary sequence bits.

11. The transmitter as claimed in claim 7,
wherein, in the case that the pilot sequence comprises twelve pilot sequence symbols, the base sequence comprises the form 00010 and two supplementary bits are present which together comprise one of the following forms:
01 or 10 or 00 or 11, and
wherein the zeros and ones are each base sequence binary bits and the supplementary binary bits.

12. The transmitter as claimed in claim 11,
wherein the pilot sequence comprises one of the following forms or forms acquired therefrom by reversing the bit order:
100000011001 or 011111100110 or 100110000001 or 011001111110 or 001010110011 or 110101001100 or 110011010100 or 001100101011 or 000000110010 or 111111001101 or 010011000000 or 101100111 or 010101100111 or 101010011000 or 111001101010 or 000110010101 or 010000001100 or 101111110011 or 001100000010 or 1100111101 or 000101011001 or 111010100110 or 100110101000 or 011001010111, and
wherein the zeros and ones are each the pilot binary sequence bits.

13. A method for transmitting signals, the method comprising:
generating signals to be transmitted, and
transmitting the signals,
wherein each of the signals comprises a pilot sequence comprising a plurality of pilot sequence symbols L,
wherein the pilot sequence is provided starting from a base sequence comprising a plurality of base sequence symbols,
wherein the pilot sequence symbols are provided by repeating each base sequence symbol R−1 times in succession so that each base sequence symbol is present R times, wherein L is a natural number, and wherein R is a natural number greater than or equal to two and is a divisor of L; and
wherein the base sequence is configured such that a correlation of the pilot sequence with a transmission signal formed from the pilot sequence comprises a main maximum,
wherein the pilot sequence comprises eight or twelve pilot sequence symbols,
wherein, in the case where the pilot sequence comprises eight pilot sequence symbols, the base sequence comprises one of the following forms:
0010 or 1101 or 0100 or 1011, and
wherein the zeros and ones are each the binary base sequences bits;
wherein, in the case where the pilot sequence comprises twelve pilot sequence symbols, the base sequences comprises one of the following forms or forms acquired therefrom by reversing the bit order:
000101, 001011, 001101, 010001, 111010, 110100, 110010 or 101110, and
wherein the zeros and ones are each the binary base sequence bits.

* * * * *

UNITED STATES PATENT AND TRADEMARK OFFICE
CERTIFICATE OF CORRECTION

PATENT NO. : 10,855,494 B2  
APPLICATION NO. : 16/591336  
DATED : December 1, 2020  
INVENTOR(S) : Jakob Kneissl et al.

Page 1 of 1

It is certified that error appears in the above-identified patent and that said Letters Patent is hereby corrected as shown below:

On the Title Page

Item (73) Assignee:
Please change "Fraunhofer-Gesellschaft zur Foerderung der angewandten Forschung e.V., Munich (DE)"

To read:
--Fraunhofer-Gesellschaft zur Foerderung der angewandten Forschung e.V., Munich (DE); Friedrich-Alexander-Universitaet Erlangen-Nuernberg, Erlangen (DE)--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*